US007224376B2

(12) United States Patent
Sumi et al.

(10) Patent No.: US 7,224,376 B2
(45) Date of Patent: May 29, 2007

(54) PHOTO-THERMOGRAPHIC RECORDING APPARATUS

(75) Inventors: Makoto Sumi, Tokorozawa (JP); Mamoru Umeki, Hachioji (JP); Masaya Shimoji, Hachioji (JP); Kazuhiro Kido, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 316 days.

(21) Appl. No.: 11/046,458

(22) Filed: Jan. 28, 2005

(65) Prior Publication Data

US 2005/0168560 A1 Aug. 4, 2005

(30) Foreign Application Priority Data

| | | | |
|---|---|---|---|
| Feb. 3, 2004 | (JP) | ............................ | 2004-026634 |
| Feb. 19, 2004 | (JP) | ............................ | 2004-042796 |
| Feb. 19, 2004 | (JP) | ............................ | 2004-042797 |
| May 26, 2004 | (JP) | ............................ | 2004-155963 |

(51) Int. Cl.
*G03D 13/00* (2006.01)
*G03B 27/00* (2006.01)
*B41J 2/435* (2006.01)

(52) U.S. Cl. ........................................ 347/140; 355/27

(58) Field of Classification Search ................ 347/129, 347/153, 155, 224, 225, 140; 396/575
See application file for complete search history.

(56) References Cited

U.S. PATENT DOCUMENTS 6,007,971 A * 12/1999 Star et al. ................... 430/350
6,309,114 B1 * 10/2001 Torisawa et al. ............ 396/575
2004/0080605 A1 * 4/2004 Sumi et al. ................. 347/207
2005/0230375 A1 * 10/2005 Shimoji et al. ............. 219/216

FOREIGN PATENT DOCUMENTS

| | | | |
|---|---|---|---|
| JP | 10-500497 | A | 1/1998 |
| JP | 11-65070 | A | 3/1999 |
| WO | WO 95/30934 | A | 11/1995 |

* cited by examiner

*Primary Examiner*—Huan Tran
(74) *Attorney, Agent, or Firm*—Frishauf, Holtz, Goodman & Chick, P.C.

(57) ABSTRACT

A photo-thermographic recording apparatus, comprises a film loading device capable of loading a sheet type photo-thermographic film, a conveyance device for conveying the photo-thermographic film from the film loading device, an exposing device for forming a latent image corresponding to an image signal onto the sheet type photo-thermographic film conveyed by the conveyance device, and a thermal developing device for visualizing the latent image formed onto the sheet type photo-thermographic film while heating the sheet type photo-thermographic, the thermal developing device including a heating device therein and a plurality of opposed rollers arranged opposite to the heating device so as to press the sheet type photo-thermographic film onto the thermal developing device, herein the plurality of opposed rollers is structured so that a foreign matter originating from an edge portion of the sheet type photo-thermographic film does not affect an image formed on the sheet type photo-thermographic film.

21 Claims, 14 Drawing Sheets

PHOTO-THERMOGRAPHIC RECORDING APPARATUS

TECHNICAL FIELD

The present invention relates to a photo-thermographic recording apparatus for forming an image onto a photo-thermographic film by developing and visualizing a latent image formed thereon by heating the film.

BACKGROUND

In conventional medical imagers or photo-thermographic recording apparatuses, the medical imager is structured so that each size of photo-thermographic films (film will be used hereinafter) of 17×14 inch size, 14×14 inch size and 11×14 inch size are processed in a single photo-thermographic recording apparatus by conveying the film in the direction being a right angle against 14 inch width direction of the film. And with regard to another size, for example, an 8×10 inch size film is processed by a dedicated photo-thermographic recording apparatus. There are no big differences between them, whichever the system is used, from the viewpoint of functions, performances and cost of the apparatus.

However, in recent years, needed is an imager capable of processing of 8×10 inch size film, etc., which has different sizes in a width direction and a longitudinal direction from that of the films described above, such as 17×14 inch size, 14×14 inch size and 11×14 inch, in a single apparatus.

In an imager employing a photo-thermographic process, there are problems specifically associated with photo-thermographic developing device which will be described below. Namely, in a photo-thermographic process, in case that a film is conveyed as the film is sandwiched by a heating drum and a plurality of opposed rollers as a means for heating and conveying the film, an elastic layer of silicon rubber, etc., is provided on the surface of a heating member to realize uniform contact between the film and the heating drum and the opposed rollers, and the uniform surface temperature of the heating drum, which is disclosed in Japanese Patent Application Open to Public Inspection No. H10-500497.

However, organic acid and/or higher fatty acid included in the photo-thermographic film volatilized by the heat drifts around the elastic layer, attacks the silicon layer and harms the cross-linking of silicon rubber as the photo-thermographic film is processed. Also, volatilized organic acid, etc., coheres and adheres onto the surface of the heating drum. Once these cohered substances form a film footmark on the surface of the heating drum, an image may be affected by these cohered substances.

Further, cutting dross from the leading edge, rear edge and side edges of the cutting surface of the film and emulsion flakes, etc., are adhered onto the heating drum and the opposed rollers. These substances harm the uniform contact or uniform thermal transmission and resulting density unevenness of the image.

Further more, a portion of the elastic layer where the film passes swells as the heating drum itself repeats heating and cooling. As a result, a crack starts to appear on the surface of the elastic layer and the crack is transferred onto the film. This phenomenon occurs since the contact condition between the heating drum and the film becomes uneven and the heat transmission across the heating drum becomes uneven. In case that a film conveyance pass in a thermal developing device is always unchanged, for example, 14 inch size, the image is formed without seriously affected and the heating drum properly operates until cracks occurs in the elastic layer even though 17×14 inch size film, 14×14 inch size film and 11×14 inch size film are processed.

However, in case that another size film which is different from 14 inch size film is processed in a single imager (a photo-thermographic recording apparatus), there has been problems that a swelling mark and/or a passing mark corresponding to the edge of the film occurs at a portion being different from 14 inch width-edge. Accordingly, when the maximum size film is processed, these marks described above appear in the image on the film.

In order to prevent those problems described above, cleaning was needed. However since a cleaning cycle becomes frequent and maintenance time and cost increase, it is not preferable to do so.

Japanese Patent Application Open to Public Inspection No. H11-65070 discloses an image recording apparatus which delays the conveyance of the new film being inputted into a thermal developing device, when the new film is a different size form a previous film, by holding the new size film for a predetermined time period. It discloses an image recording apparatus designed to unify the surface temperature of the heating drum by continuing rotation and heating of the heating drum by a heater while holding the new size film which will be inputted into the thermal developing device. However, it is not an image recording apparatus capable of removing the problems associated with the heating process of the photo-thermographic film.

It also discloses a photo-thermographic recording apparatus for removing dirt adhering onto a heating drum and preventing doted image defects by providing a dirt removing means having stickiness on the surface of the dirt removing means to be in contact with the heating drum, when visualizing an image formed on a photo-thermographic film by sandwiching the film between the heating drum and an endless belt in a heating device. However, it does not disclose the affection of foreign matter to the opposed roller and the cleaning of the opposed roller which is an auxiliary means operating together with the heating device.

SUMMARY

An object of the present invention is to provide a photo-thermographic recording apparatus for securing uniform contact and heat transmission between an opposed roller and a heat drum and to prevent foreign matters, such as cohered and adhered fatty acid volatized from cutting dross and emulsion flakes from an adjacent portion of a film cutting surface, which are adhered and solidified on the opposed roller from growing, when conducting a thermal developing process of a plurality of sizes of photo-thermographic films to solve the problems of prior art described above.

(1) In accordance with one aspect of the present invention, a photo-thermographic recording apparatus comprises a film loading device capable, of loading a sheet type photo-thermographic film, a conveyance device for conveying the photo-thermographic film from the film loading device, an exposing, device for forming a latent image corresponding to an image signal onto the sheet type photo-thermographic film conveyed by the conveyance device and a thermal developing device for visualizing the latent image formed onto the sheet type photo-thermographic film while heating the sheet type photo-thermographic, the thermal developing device including a heating device therein and a plurality of opposed rollers arranged opposite to the heating device so as to press the sheet type photo-thermographic film onto the thermal developing device, the plurality of opposed roller being capable of contacting a predetermined portion of the thermal developing device, wherein the plurality of opposed rollers is structured not to contact the heating device in an area adjacent to both edges of the sheet type photo-thermographic film being in contact with the heating device.

(2) In accordance with another aspect of the present invention, the photo-thermographic recording apparatus of (1), wherein the plurality of opposed rollers is structured not to contact portions adjacent both sides of the heating device which the photo-thermographic film contacts and the exposing device corrects an exposing amount of an area where the sheet type photo-thermographic film is in contact with the heating device and not in contact with the plurality of opposed rollers.

According to the photo-thermographic recording apparatus, since each opposed roller does not contact the area adjacent to both edges of the sheet type photo-thermographic film which is in contact with the heating device, it becomes difficult for cutting dross and emulsion flakes originated from the film edges to adhere on the opposed rollers. Consequently, foreign matter growth based on adhesion of the cutting dross and emulsion flakes onto the opposed rollers is prevented. Accordingly uniform contact between opposed rollers and a heating drum can be obtained. Also, since foreign matter growth is prevented, the maintenance cycle of the apparatus can be prolonged. Further, since the area where the film is not in contact with the opposed rollers does not have heat transmission from the opposed rollers, it is anticipated that there is a possibility that optical density is lowered. However, heat deficit can be compensated by correction of an exposure amount and the optical density of film finishing can be kept constant.

(3) In accordance with another aspect of the present invention, the photo-thermographic recording apparatus described in (1), wherein a predetermined opposed roller of the plurality of opposed rollers is deposited by fluorine resin.

(4) In accordance with another aspect of the present invention, a photo-thermographic recording apparatus comprises a film loading device capable of loading a plurality of different sizes of sheet type photo-thermographic films having a rectangular shape, a conveyance device for conveying a sheet type photo-thermographic film from the film loading device, an exposing device for forming a latent image corresponding to an image signal onto the sheet type photo-thermographic film conveyed by the conveyance device and a thermal developing device for visualizing the latent image formed onto the sheet type photo-thermographic film while the thermal developing device heats the photo-thermographic film, the thermal developing device including a heating device and an opposed roller for pressing the sheet type photo-thermographic film on to the developing device wherein the plurality of opposed rollers includes a predetermined opposed roller deposited by fluorine resin and at least the predetermined opposed roller does not contact an edge portion in which a maximum size of the photo-thermographic film contacts the heading device.

According to the photo-thermographic recording apparatus, since the lubricity, the repellency and the non-adhesiveness of opposed roller are improved by plating fluorine resin onto the opposed rollers, it become difficult for foreign matters such as cohesion substance of organic acid and/or higher fatty acid being volatized from a photo-thermographic film when developed, cutting dregs and emulsion flakes to be adhered to the surface of the opposed rollers. Consequently, adhering and growth of foreign matters on the opposed rollers can be prevented and it becomes possible to lower the possibility of damage to the heating drum by grown foreign matters. As a result a cleaning cycle can be prolonged.

(5) In accordance with another aspect of the present invention the photo-thermographic recording apparatus described in (4), wherein the conveyance device conveys different sizes of sheet type photo-thermographic film with a plurality of different phases in a lateral direction, and conveys the sheet type photo-thermographic film on a slant to the opposed roller of the heating device, the sheet type photo-thermographic film being placed within a maximum phase width in the lateral direction.

According to the photo-thermographic recording apparatus, since a small sized sheet type photosensitive film is conveyed in a slant position to the opposed rollers, the entrance positions of the front edge and rear edge of the film to the opposed rollers are different. Consequently, film cutting dross and emulsion flakes are not concentrated but distributed. As a result, cores on which higher fatty acid volatized from the film is distributed when the apparatus operates and it becomes difficult for cohesion subject to grow into large solid subject when the apparatus is not operated. Consequently, uniform contact between the heating device and the film and the pressing device (opposed rollers) can be obtained. Further, foreign subject can be distributed when photo-thermographic film size is changed from a small size to a large size, and the maintenance cycle of the apparatus can be prolonged comparing with a conventional apparatus.

DETAILED DESCRIPTION OF PREFERRED EMBODIMENT

Figure 2:
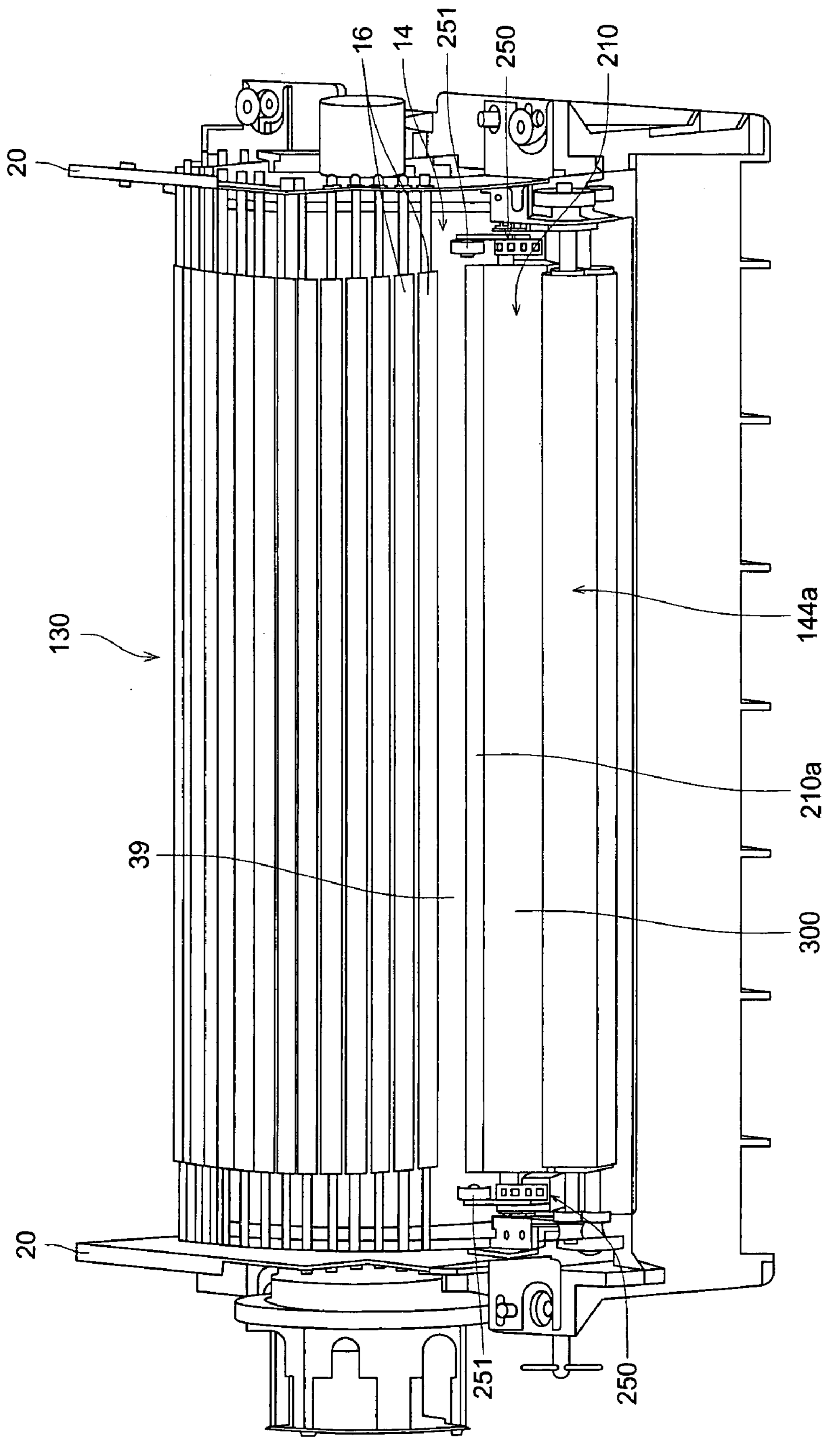
FIG. 2 is a perspective view of the thermal developing device viewing from a film exit side of the photo-thermographic recording apparatus shown in FIG. 1.
Figure 3:
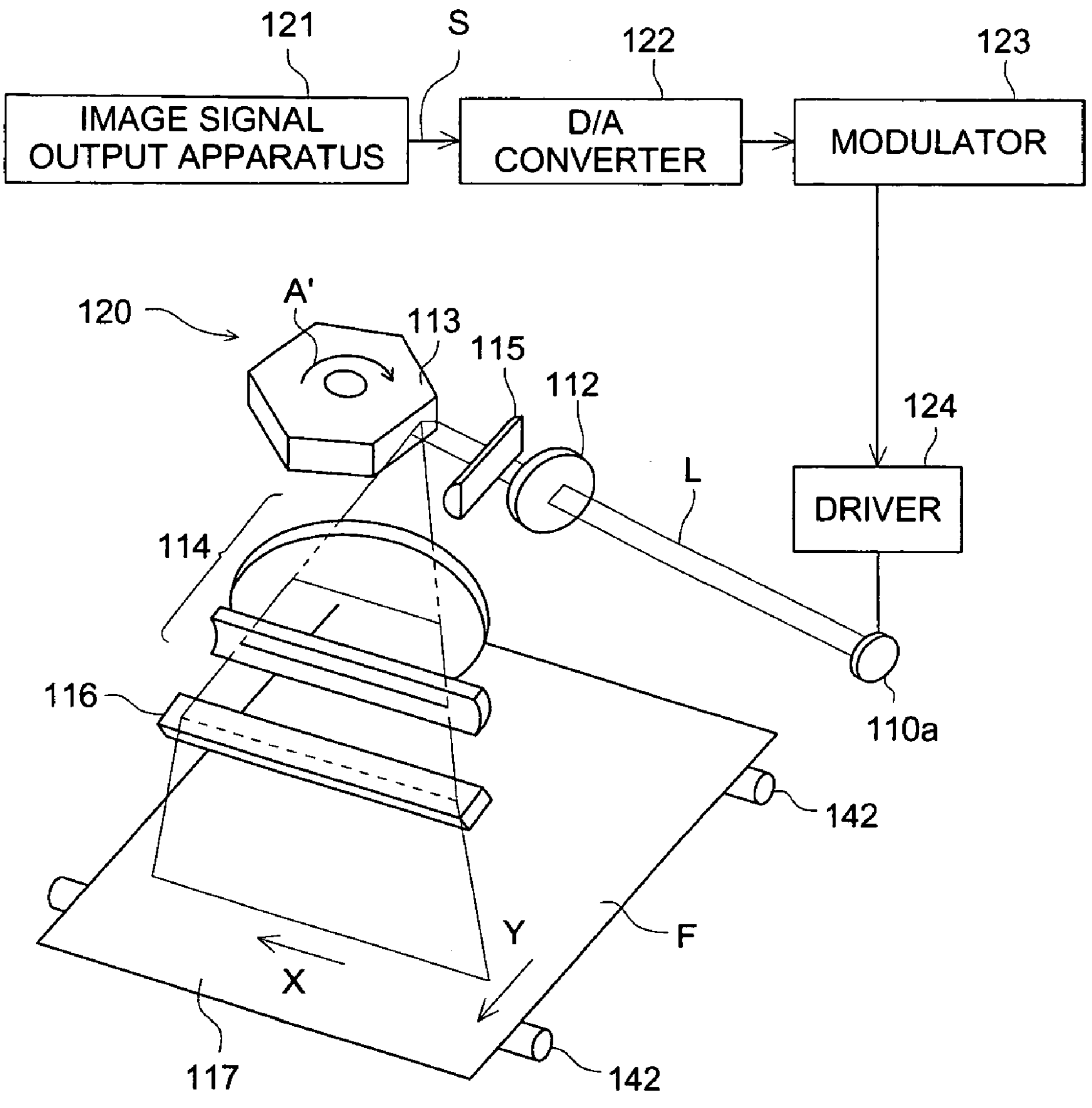
FIG. 3 is a schematic diagram of the exposing device of the photo-thermographic recording apparatus shown in FIG. 1.

A preferred embodiment of the present invention will be described by using drawings below. FIG. 2 is a perspective view of a photo-thermographic recording apparatus shown in FIG. 1 being viewed form the exit side of a film. FIG. 3 is a schematic diagram of an exposing device of the photo-thermographic recording apparatus shown in FIG. 1.

Figure 1:
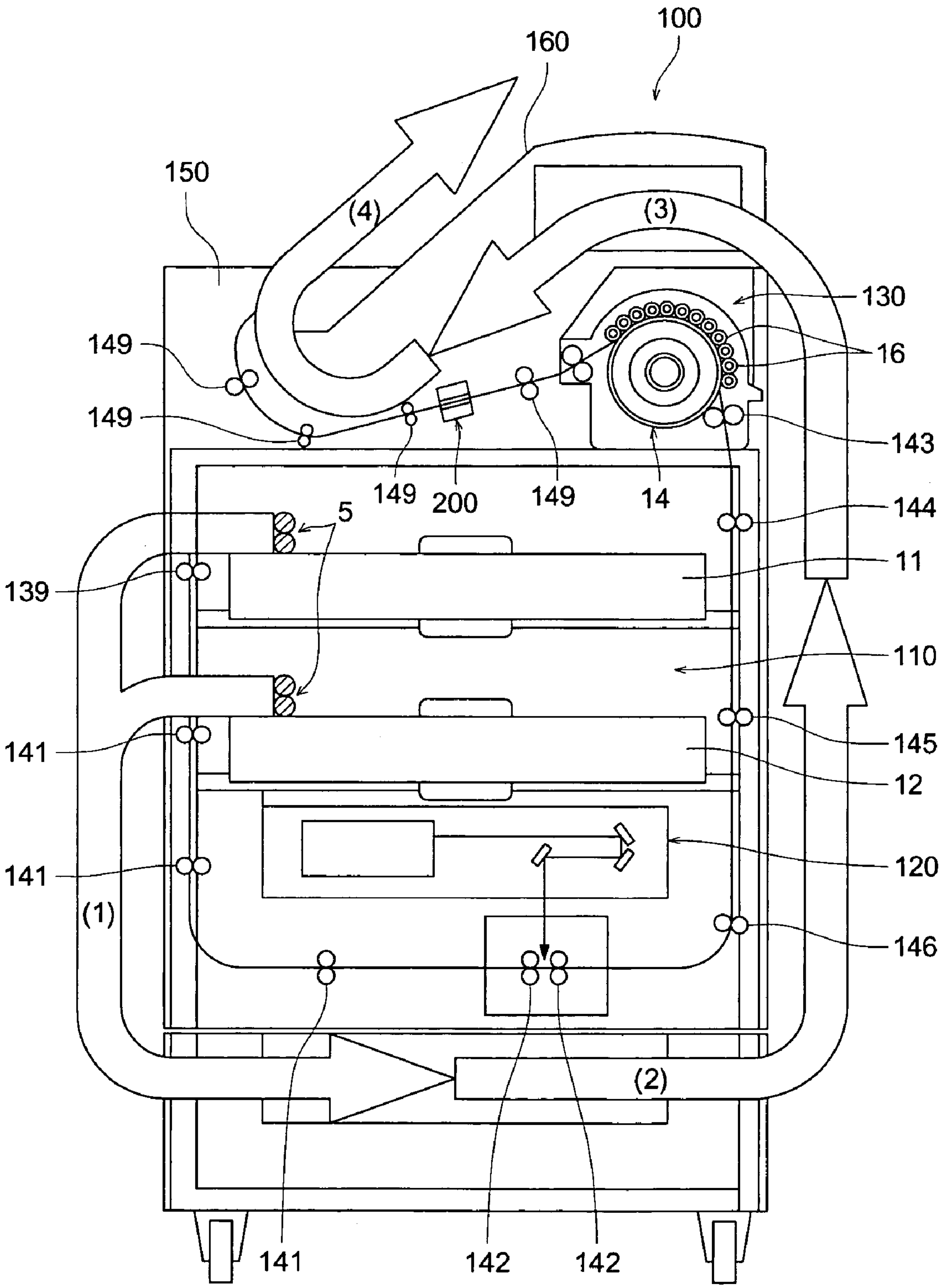
FIG. 1 is a front elevation showing main portion of a photo-thermographic recording apparatus of the present invention.

Photo-thermographic recording apparatus 100 shown in FIG. 1 comprises first and second loader 11 and 12 in which packages of photo-thermographic films being packaged into one package with a predetermined number of the films are loaded, feeder 110 having conveyer 5 for conveying films which conveys one sheet of film at a time, exposing device 120 for exposing the film conveyed from feeder 110 and forming a latent image, thermal developing device 130 for thermally developing the formed latent image, density measuring device 200 for measuring the density of the developed film and cooling conveyer 150 including conveyer rollers 149, etc.

First loader 11 and second loader 12 of feeder 110 are capable of loading different sizes of films respectively. A film conveyed from first loader 11 or second loader 12 is conveyed via conveyer 5 by paired conveyance rollers 139 and 141 (first conveyer) in the direction (1) indicated by an arrow as shown in FIG. 1. The film conveyed in the direction (2) indicated by the arrow and a latent image is formed on the film by exposing device 120 while it is sub-scanned. Then the film is conveyed in the direction (3) indicated by the arrow by paired conveyance rollers 146, 145, 144 and 143 (second conveyer) and the latent image is visualized by thermal developing device 130. Further, the film is conveyed in the direction (4) indicated by the arrow and cooled by cooling conveyer 150. Then it is ejected from ejector 160.

Figure 4:
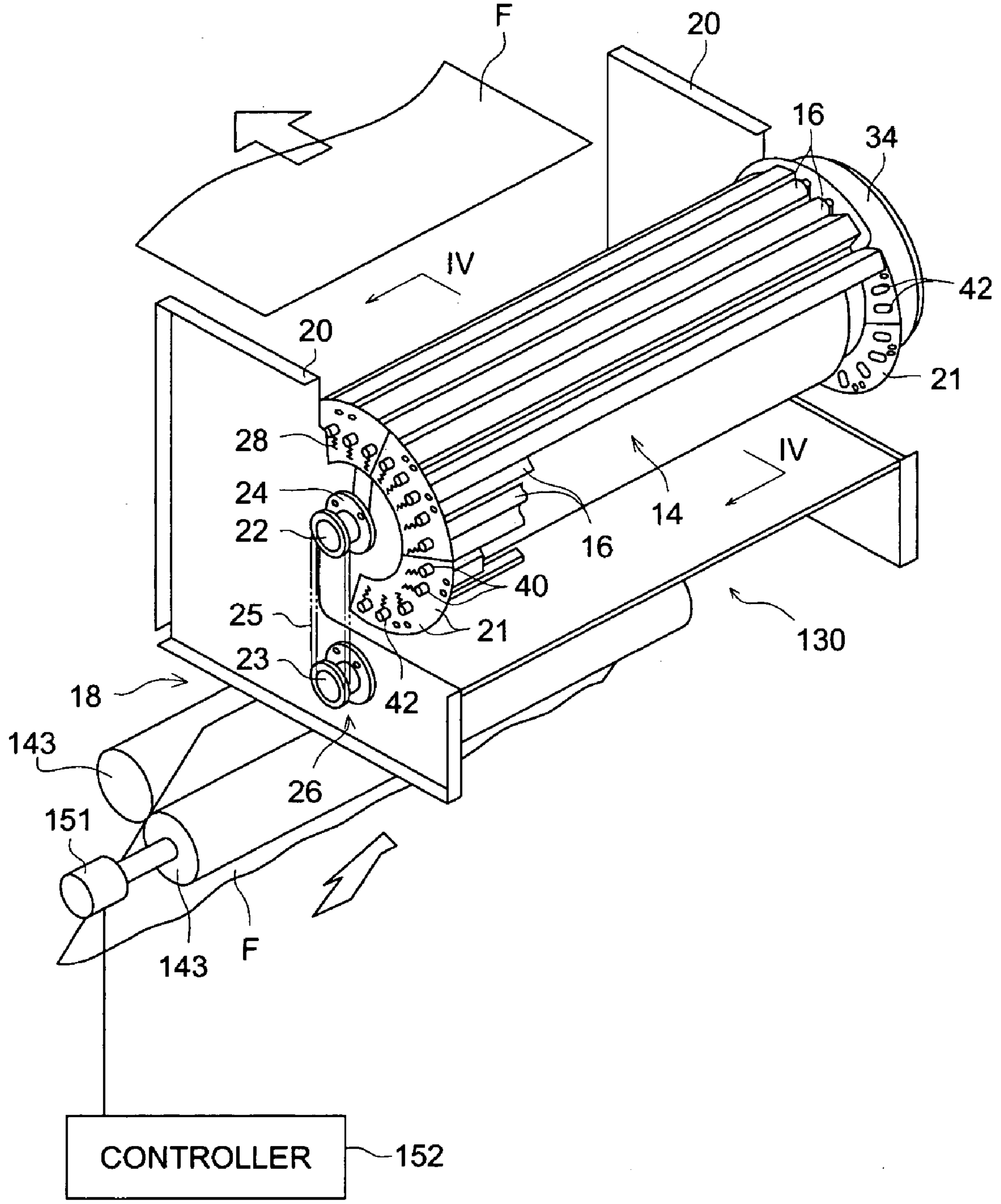
FIG. 4 is a perspective view of thermal developing device 130 shown in FIG. 1.
Figure 13:
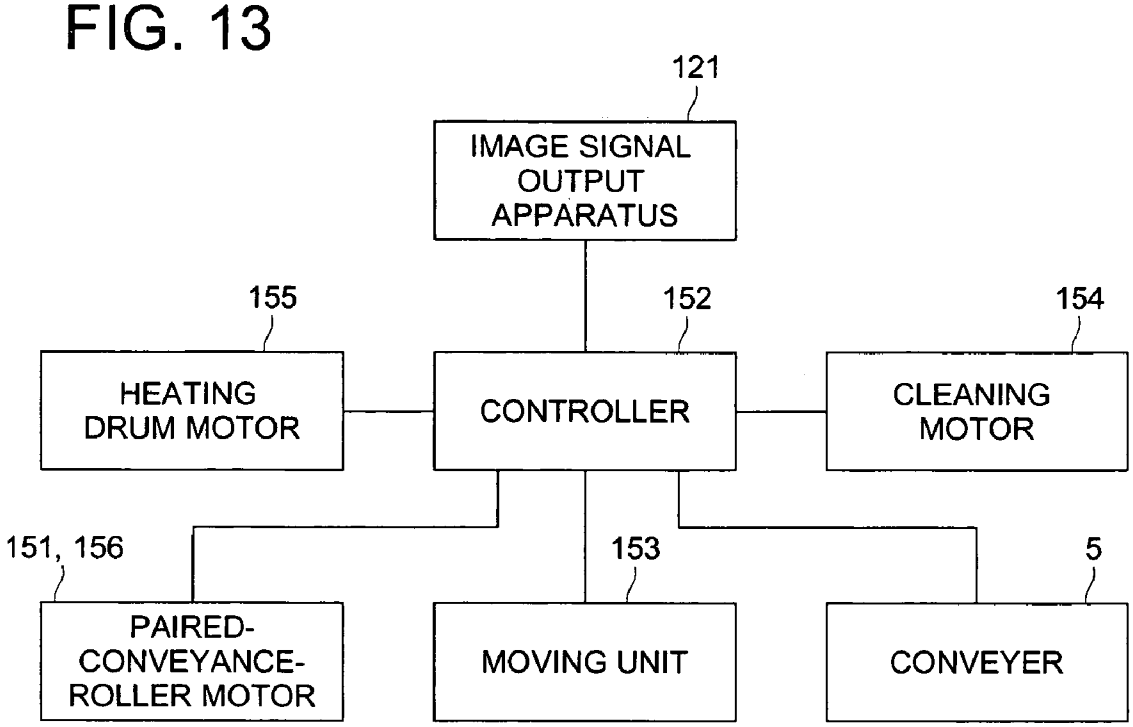
FIG. 13 is a block diagram showing a control system for cleaning device 13, paired-conveyance rollers 144 and conveyance device 5, etc. shown in FIGS. 11 and 12.

Paired conveyance rollers 139, 141, 142, 146, 145, 144 and 143 are driven by motors 151 and 156 being controlled by CPU (Central Processing Unit) in controller 152 as shown in FIGS. 4 and 13.

Exposing device 120 will be described below. Exposing device 120 forms a latent image onto film F by using laser beam L. As shown in FIG. 3, laser beam L modulated by image signal S (amplitude modulation) is reflected by polygon mirror 113 and irradiated onto film F for main scanning. Film F is simultaneously moved in the direction being substantially right angle with regard to the main scanning direction for sub-scanning. As a result, laser beam L forms latent image onto film F as described above.

The configuration of exposing device 120 will be described below. As shown in FIG. 3, image signal S being digital data outputted from outside image signal output apparatus 121 is converted into analog signal by D/A converter 122 and inputted to modulation circuit 123. Modulation circuit 123 is arranged to control driver 124 of laser beam source 110*a* which radiate modulated laser beams.

Laser beam L radiated from laser beam source 110*a* is arranged to be guided on polygon mirror 113 rotated in the direction A' shown in arrow in FIG. 3 as a line image being vertical to the driving shaft of polygon mirror 113 after passing through lens 112 and cylindrical lens 115 which converges laser beam L only in a up and down direction. Polygon mirror 113 polarizes laser beam L in the main scanning direction. Polarized laser beam L is reflected by mirror 116 provided in a laser beam path, which is prolonged in the main scanning direction, after passing via fθ lens 114 structured by two cylindrical lenses and repeatedly irradiated (main scanned in the direction X as shown by an arrow) onto film F conveyed by paired conveyance rollers 142 in the direction Y as shown in an arrow (sub-scanned). Namely, laser beam L is entirely irradiated onto the surface to be scanned 117 of film F.

The cylindrical lens of fθ lens 114 is arranged to converge incident laser beam L only in the sub-scanning direction onto surface to be scanned 117 of film F. The distance from fθ lens 114 to surface to be scanned 117 is arranged to be the focal distance of fθ lens 114. As described above, in exposing device 120, since fθ lens 114 including a cylindrical lens and mirror 116 are provided and further laser beam L is once converges on the surface of polygon mirror 113 in the sub-scanning direction, the scanning position on surface to be scanned 117 of film F does not shift even though surface deflection and/or shaft deflection occur/occurs, and as a result, constant pitch scanning can be conducted. Polygon mirror 113 has advantage that it is superior to a galvanometer mirror and an optical deflector in scanning stability. As described above, a latent image based on image signal S is formed onto film F.

Figure 5:
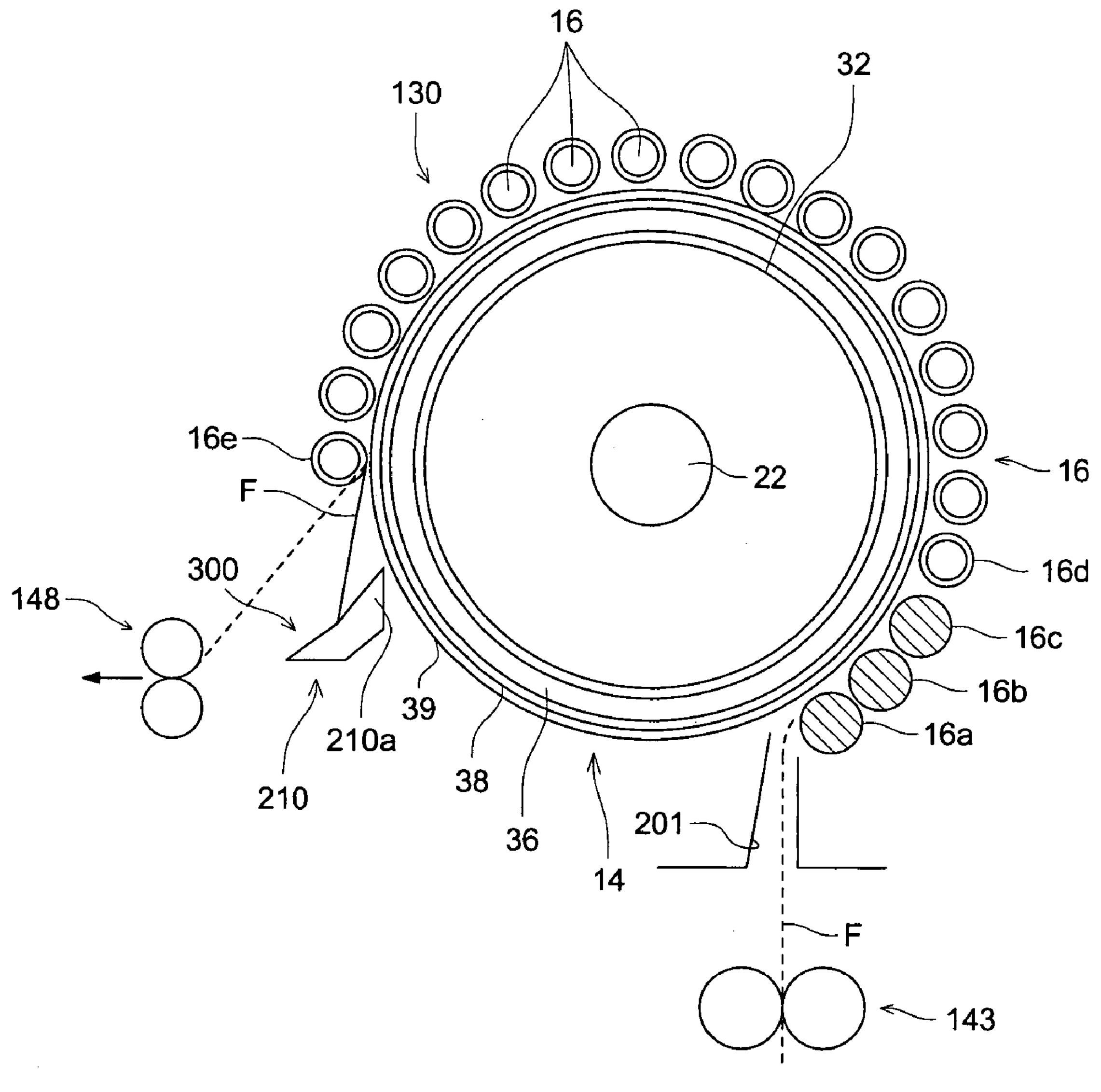
FIG. 5 is a cross-sectional view of the structure of thermal developing device shown in FIG. 4 being viewed from the direction indicated by angled arrows IV—IV.
Figure 6:
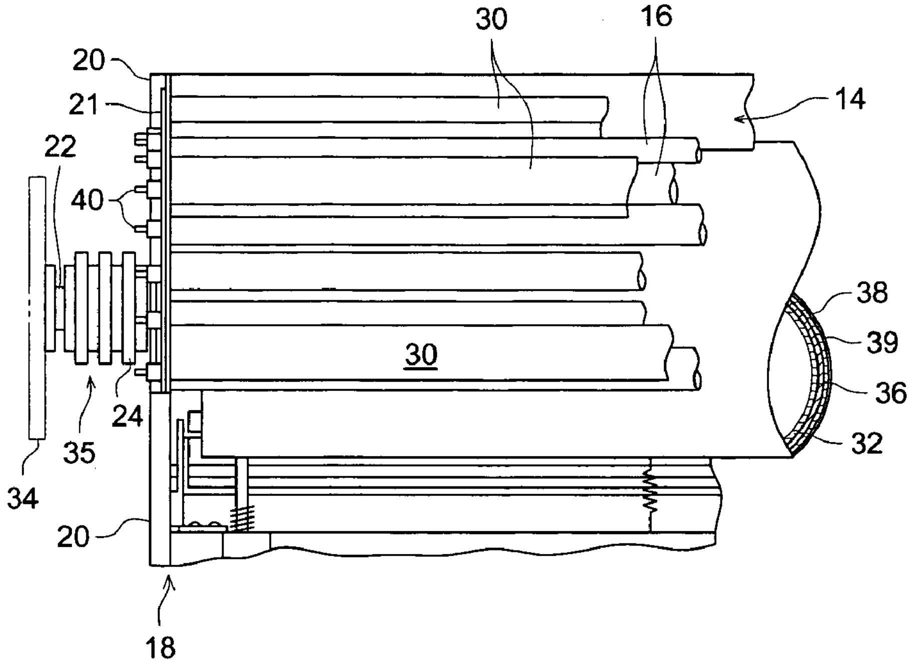
FIG. 6 is a front elevation of the structure shown in FIG. 4.

FIGS. 4–6 show a structural drawing of thermal developing device for heating film F. FIG. 4 is a perspective view of thermal developing device 130. FIG. 5 is a cross-sectional view of the structure of thermal developing device shown in FIG. 4 being viewed from the direction indicated by angled arrows IV—IV. FIG. 6 is a front elevation of the structure shown in FIG. 4.

Thermal developing device 130 has heating drum 14 as a heating member which heats film F while holding film F being in contact with the outer surface of heating drum 14 in thermal developing device 130. Heating drum 14 changes a latent image formed on film F into a visible image by heating and keeping film F at temperature more than minimum thermal developing temperature for a predetermined thermal developing time. The minimum thermal temperature is temperature at which the latent image formed on film F starts to be developed. For example, it is more than 95° C. Thermal developing time is time for which film F should be kept at temperature more than the minimum thermal developing in order to develop a latent image into a visible image having needed developing characteristic. Still, it is preferable that film F should not be thermally developed at less than 40° C.

As shown in FIGS. 4 and 5, there is provided a plurality of opposed rollers in the outside of heating drum 14 as a guide member and pressing member of film F, each of which has a smaller diameter than that of heating drum 14 and can be freely rotated. The opposed roller is provided parallel to the rotational axis of the shaft of heating drum 14 and opposed to the outer surface of heating drum 14.

Opposed roller 16 is structured by stainless steal. Opposed rollers 16*a*, 16*b* and 16*c* provide in the upper stream have a diameter of 12 mm being large diameter solid roller and the rest of opposed rollers, from 16*d* to 16*e* structured by a pipe having a diameter of 8 mm being a small diameter roller. It is preferable that the thermal capacity of opposed roller 16 is not less than 0.16 kJ/K and the thermal capacity of stainless steal being a material of opposed roller is about 0.18 kJ/K.

Opposed rollers 16*a* and 16*b* of the plurality opposed rollers 16 structured by a steel metal material have deposited-fluorine resin and nickel thereover. For example, electroless deposition of Ni—P is conducted by dipping the opposed rollers being a substance to be deposited into solution and depositing the minute particle of polytetrafluoroethylene (PTFE) being fluorine resin onto nickel coating. It gives the surface of the opposed rollers lubricating ability, repellency and non-stickiness. Accordingly, since opposed rollers 16*a* and 16*b* have superior lubricating ability, repellency and non-stickiness, it becomes difficult for foreign matters such as cohesion substance of organic acid and/or higher fatty acid being volatized from a photo-thermographic film when developing, cutting dregs and emulsion flakes to be adhered to the surface of the opposed rollers.

In both edges of heating drum 14, three guiding brackets 21 supported by flame 18 is provide in each side. Opposed "C" type shape is formed by combining guiding brackets 21 in the both ends of heating drum 14.

Guiding bracket 21 temporally holds a plurality of opposed rollers 16 at both ends of the opposed rollers 16. The holding position by brackets 21 is arranged to be adjustable. Namely, the relative position of a plurality of opposed rollers 16 against heating drum 16 can be adjusted by adjusting the position of guiding brackets 21. Accordingly, since the parallel accuracy between the axis direction of heating drum 14 and opposed rollers 16 can be adjusted, a film can uniformly contact the outer peripheral surface of heating drum 14. Particularly, as described later, when a smooth surface of fluorine resin is provided on the outer peripheral surface of heating drum 14, providing guiding bracket 21 capable of adjusting the parallel accuracy, even though the density unevenness is likely to occur, can prevent density unevenness.

Nine long holes 42 extended in a radial direction are provided each of guiding bracket 21. Shaft 40 provided in the end portion of opposed roller 16 is extended from long hole 40. One end of each coil spring 28 is attached to each shaft 40 and another end of each coil spring 28 is attached to the portion adjacent to the inner edge of guiding bracket 21. Accordingly, each opposed roller 16 is forced to the direction toward the outer peripheral of heating drum 16 based on the predetermined force of each coil spring 28. Film F is uniformly heated by being pressed toward the outer peripheral surface of heating drum 14 by the predetermined force when film F is inserted between heating drum 14 and opposed roller 16. As described above, opposed roller 16 forced toward heating drum 14 being rotated coveys a film while sandwiching the film with heating drum 14.

Shaft 22 coaxially connected to heating drum 14 extending toward the outer direction from end member 20 of flame 18 is freely supported by end member 20 via shaft bearing 24. A gear (not shown) is formed in rotary shaft 23 of micro-stepping motor (not shown) located under shaft 22 and attached to end member 20. Another gear is formed in shaft 22. Power of the micro-stepping motor is transmitted via timing belt 25 which connects both gears and rotates heating drum 14. It is also possible to transmit the power from rotary shaft 23 to shaft 22 via a chain and gear instead of timing belt 25.

As shown in FIGS. 4–6, heating drum 14 comprises freely rotated cylindrical type aluminum sleeve 36, heater 32 being a heating source stuck on the internal surface of sleeve 36, soft elastic layer 38 structured by silicon rubber which is attached on the outside of sleeve 36 and smooth layer 39 as a most outer layer formed into predetermined thickness being backed at predetermined temperature after fluorine resin is deposited on the outer peripheral surface of sleeve 38. Heating drum 14 is heated under the control of energization of heater 32.

The thickness of elastic layer 38 and thermal conductivity are selected so that a continuous process of a plurality of films F can be efficiently conducted. It is preferable that the thermal conductivity of elastic layer 38 is not less than 0.5 W/k. It is preferable that the hardness of elastic layer 38 is from 20 to 70 degree in Japanese Industry Standard (JIS)-A hardness. Elastic layer 38 may be indirectly attached on to sleeve 36.

Elastic layer 38 can be structured by rubber or a rubber type member. As rubber or rubber type member, other than various rubber materials or thermoplastic elastomer, various materials having elasticity being the same as that of rubber member are widely available. For example, various rubber material, resin material and thermoplastic elastomer may be used as a single material or a mixed material. In this case, each rubber material is not limited and for example, other than solid rubber member, liquid type reaction hardening substance which can be obtained by hardening liquid type elastic substance may be used.

With regard to a solid rubber material, for example, ethylene-propylene-ternarycopllymer (EPDM), butyle rubber, polyisobutylene, ethylene-propylene rubber, chloroprene rubber, natural rubber, styrene-butadiene rubber, styrene-isoprene-styrene, styrene-butadiene-styrene or polyurethane rubber is singularly or compositely used with vulcanizing agent or combination agent such as cross linking agent, vulcanization accelerator, vulcanization accelerating auxiliary agent, tackifier, bulking agent, plasticizer, agent resistor or solvent being used in a general rubber industry is combined with a single and combination material of polymer.

Liquid type rubber material includes urethane, liquid state polybutadiene, degeneration silicon, silicon and polysulphide. It is preferable that these material described above is used after mixing a predetermined hardening agent and reaction-hardening. Elastic layer 38 may be formed into a solid state or a sponge state.

With regard to fluorine resin used for depositing for forming smooth-layer 39, for example, chemical compound of polytetrafluoroethylene (PTFE), polychlorotrifluoroethylene (PCTFE), polyvinyliden fluoride (PVDF), copolymer of oethylene and perfluoroalkoxyethylene (ETFE), copolymer of tetrafluoroethylene and hexafluoropropylene (FEP) is used.

When film F placed around heating drum 14 is heated due to heating phenomenon, for example, gas containing chemical ingredient such as organic acid is generated. However, since fluorine resin which structures smooth layer 39 provided on the surface of elastic layer 38 has non-chemical reactivity, it does not react to gas ingredient such as organic acid. Accordingly, fluorine resin is not be deteriorated. Also, since fluorine resin shuts off the gas ingredient so that the gas ingredient does not contact elastic layer 38 structured by silicon rubber, etc., elastic layer 38 is not be deteriorated or degenerated by the gas ingredient. Accordingly, since the secular change of the shape and characteristic of elastic layer 38 seldom happens, initial elasticity and thermal conductivity can be maintained.

It is preferable that the thickness of smooth layer 39 is not less than 10 μm from the view point of preventing elastic layer 38 from deterioration by gas ingredient of organic acid, and not more than 60 μm from the view point of preventing density unevenness.

It is necessary to pay attention to the selection of the forced power of coil spring 28, since the force power of coil spring 28 is determined so that film F securely contacts the outer peripheral surface of heating drum 14 and is steadily conveyed while receiving enough thermal transmission. Namely, when forced power of coil spring 28 is small, it is anticipated that heat does not uniformly transmit onto film L and resulting incomplete image development and unsteady conveyance of film F.

Figure 7:
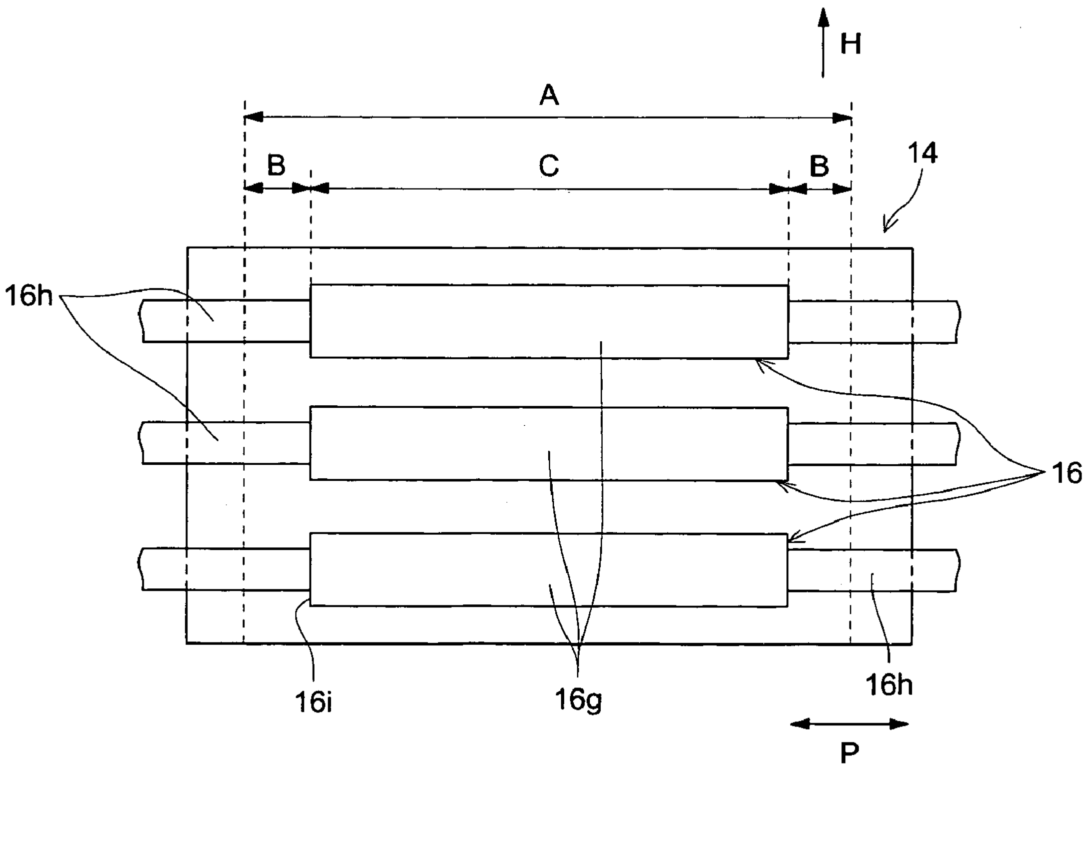
FIG. 7 is a plan view schematically showing opposed rollers arranged against the heating drum shown in FIG. 2 and the passing width of a film.
Figure 8:
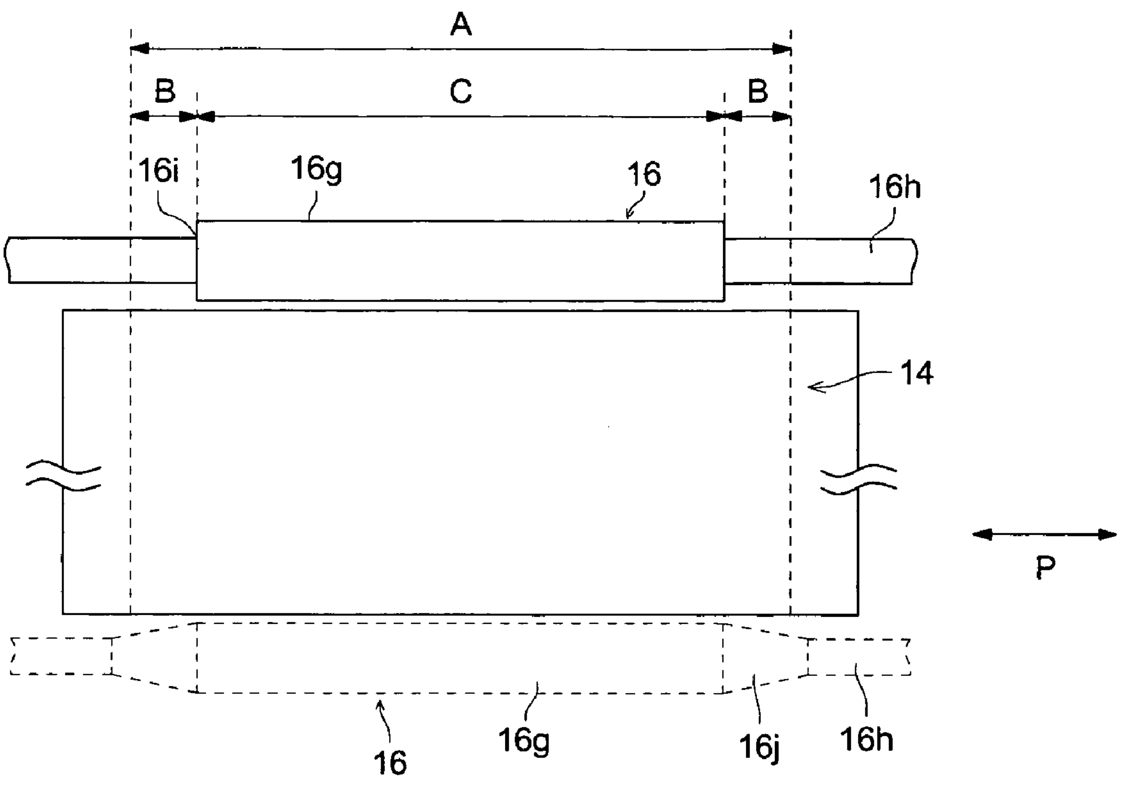
FIG. 8 is a schematic diagram showing the opposed roller shown in FIG. 7 is in contact with the surface of a heating drum.

The relationship between a contacting area of opposed roller against the heating drum (a position of opposed roller) and a contacting area of film against the heating drum (a film passing width) will be described by using FIGS. 7–8. FIG. 7 is a plan view schematically showing opposed rollers arranged against the heating drum shown in FIG. 2 and the passing width of a film. FIG. 8 is a schematic diagram showing the opposed roller shown in FIG. 7 is in contact with the surface of a heating drum.

As shown in FIGS. 7–8, a plurality of opposed rollers 16 is arranged in the center shaft direction P of heating drum 14. The plurality of opposed roller 16 includes a large diameter portion 16*g* positioned in the center of heating drum 14 with regard to the center shaft direction P and a small diameter portion 16*h* positioned in both ends of heating drum 14 with regard to the center shaft direction P. Boarder 16*i* between large diameter portion 16*g* and small diameter portion 16*h* is shaped in a step shape. In this embodiment, since large diameter portion 16*g* of opposed roller 16 can contact heating drum 14, the length of large diameter potion 16*g* corresponds to opposed roller contacting width C.

A film is conveyed between heating drum 14 and opposed roller 16 by the rotation of heating drum 14 while being heated in the circumferential direction of heating drum 14 shown in FIG. 7. In this case, since the film contacts heating drum 14 with contacting area A in the central shaft direction P as shown in FIGS. 7–8, area A corresponds to a film contacting area in the embodiment of the present invention. Film contacting width A corresponds to a film passing width on heating drum 14.

As shown in FIGS. 7–8, the length of large diameter portion 16*g* which structures opposed roller contacting width C is arranged to be shorter than film contacting width A and distance B (=(A−C)/2) between border 16*i* of opposed roller 16 and each edge of film contacting width A is kept. Each edge of film contacting width A corresponds to small diameter portion 16*h*.

As shown in FIGS. 7–8, opposed roller contacting width C being formed by large diameter portion 16*g* capable of contacting the surface of heating drum 14 is shorter than film contacting width A. The fact that opposed roller. contacting width C is positioned within film contacting width A is kept even though the film comes to the condition that the film becomes a non-contact condition while the film is located between heating drum 14 and large diameter portion 16*g* of opposed roller 16 when the film is in thermal developing process. As described above, when the film contacts heating drum 14, since each opposed roller 16 does not contact heating drum 16 in the area adjacent the both film edges, cutting dross and emulsion flakes from the area adjacent film edges when thermally developed become difficult to be adhered onto opposed roller 16, specially large diameter portion 16*g* and resulting in no-adherence. Accordingly, since higher fatty acid volatized from a photo-thermographic film when being thermally processed with thermal developing device 130 does not form a core on which the higher fatty acid is adhered when the operation of an apparatus is stopped and temperature goes down, it becomes possible to prevent foreign matter having a core of adherence from growing and to realize uniform contact between opposed roller 16 and heating drum 14.

Further it becomes possible to prolong the maintenance cycle of an apparatus since it is possible to prevent foreign matter based on a core of adherence from growing by the repetition of operation/stopping cycle of the apparatus.

As shown in FIGS. 5–6, smooth surface layer 39 being structured by fluorine resin is provided onto the most outer periphery layer of elastic layer 38 arranged in heating drum 14. Consequently, due to good release characteristic of smooth surface layer 39, emulsion flakes from the edge of the film and/or cutting dross easily adhere on small diameter portion sides 16*h* corresponding to left and right sides of metal opposed roller 16. Accordingly, the emulsion flakes and the cutting dross are not left on heating drum 14. Further, even though higher fatty acid solidifies on cutting dross and emulsion flakes being adhered on small diameter portion 16 of opposed roller 16 as cores and gradually grows, uniform contact between opposed roller 16 and heating drum 14 is kept until the convexity of the higher fatty acid solidifies on cutting dross and emulsion flakes being adhered on small diameter portion 16 reaches to the height more than the radius of large diameter portion of 16*g*. Accordingly, the cleaning maintenance cycle of opposed rollers can be prolonged.

Figure 10:
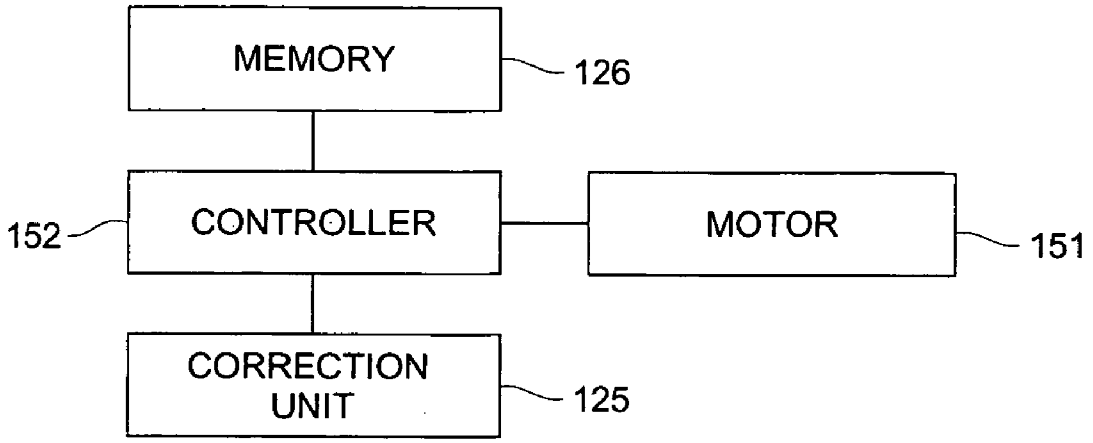
FIG. 10 shows a block diagram of photo-thermographic recording apparatus 100 shown in FIGS. 1–6.

The configuration for correcting an exposure amount in a portion where a film contacts a heating drum but does not contact an opposed roller (corresponding to distance) shown in FIGS. 7–8 by using FIG. 10. FIG. 10 is a block diagram of photo-thermographic apparatus 100 shown in FIGS. 1–8.

As shown in FIG. 10, controller 152 including CPU (Central Processing Circuit) controls correction unit 125 for outputting correction signal indicating a correction amount for correcting an exposure amount for an area corresponding to distance B shown in FIGS. 7–8, memory 126 for storing the correction amount corresponding to the condition of the area corresponding to distance B as shown in FIGS. 7–8, motor 151 shown in FIG. 4 and other portions.

Further, the correction amount corresponding to distance B shown in FIGS. 7–8, being stored in memory 126 can be determined by the measurement results of film density in an area corresponding to distance B which is obtained by conducting an experiment of exposing and developing a film with predetermined exposure amount inputted in memory 126.

According to controller shown in FIG. 10, when image signal S from image signal outputting apparatus 121 shown in FIG. 3, a film is conveyed from loading device 11 or 12 shown in FIG. 1, and exposing signal modulated by image signal S, is corrected by correction signal from memory 126 in correction unit 125. Then exposure amount of laser beams in exposing device 120 is corrected and the film is exposed by the corrected exposure amount.

Since a film area corresponding to distance B which does not contact opposed roller 16 shown in FIGS. 7–8, does not have heat given from opposed roller 16, it is anticipated that the optical density of the area is lower than an area contacting opposed rollers. However, as described above, the exposure amount of the area corresponding to distance B shown in FIG. 7–8, is correct and a latent image is formed. Accordingly, since the thermal deficit can be compensated by the exposure amount, the finishing density of the film can be maintained in constant.

Further, small diameter portion 16*h* of opposed roller 16 is corresponding to the edge portion of film contacting width A and distance B is secured between boarder 16*i* of opposed roller and each edge of film contacting width A. Consequently, when a film is conveyed to the direction H as shown in FIG. 7, even though the film is slightly slanted, it is possible to keep the fact that opposed roller contacting width C is shorter than film contacting width A.

Further more, two opposed rollers 16*a* and 16*b* positioned in the upper stream have nickel and fluorine resin deposited onto the surface of opposed rollers 16*a* and 16*b*. Accordingly opposed rollers 16*a* and 16*b* have superior lubricating ability, repellency and non-stickiness. As a result it become difficult for foreign matters such as cohesion substance of organic acid and/or higher fatty acid being volatized from a photo-thermographic film when developing, cutting dregs and emulsion flakes to be adhered to the surface of the opposed rollers.

Further, as shown in FIG. 5, upstream opposed rollers 16 of the plurality of opposed rollers are located in a place adjacent to film entrance 201. Especially, gas of organic acid or higher fatty acid volatized from a film being heated is likely to drift in a place adjacent to opposed rollers 16*a* and 16*b* located in the upstream side and film entrance 201. When an operation of the apparatus stops, the temperature goes down and the gas is likely to cohere to opposed rollers 16*a* and 16*b* located in the upstream side and dirt appears on the film. However, as a result it become difficult for foreign matters such as cohesion substance of organic acid and/or higher fatty acid being volatized from a photo-thermographic film when developing, cutting dregs and emulsion flakes to be adhered to the surface of the opposed rollers.

In case that photo-thermographic recording apparatus 100 shown in FIG. 1 is capable of processing 8×10 inch size film, 10×12 inch size film, 11×14 inch size film. 14×14 inch size film and 14×17 inch size film, in general, almost of films used in the apparatus are 11×14 inch size film, 14×14 inch size film and 14×17 inch size film all of which can be conveyed with 14 inch width. Namely, there is a possibility that foreign matters always adheres on 14 inch width portions on the opposed roller. On the other hand, the usage of 8×10 inch film and 10×12 inch film is small and the possibility of adherence of foreign matter is relatively low. Accordingly, it is possible to control the amount of foreign matter adherence by depositing fluorine resin onto the opposed roller and a maintenance cycle can be prolonged. In the prolonged maintenance cycle, since 14 inch width portion of opposed roller 16 corresponds to small diameter portion 16*h,* foreign matter does not adhere onto the film due to the shape of opposed roller 16.

The present invention will be described in detail by using an embodiment. As the embodiment of this invention, a photo-thermographic recording apparatus as shown in FIGS. 1–8 was built. Opposed rollers are structured by steel metal having diameters of 10 mm and 8 mm respectively. Fluorine resin and nickel are deposited on the two opposed rollers provided on the most upstream side. And the diameter of a heating drum is 140 mm. The percentage of the particle of fluorine resin in a nickel coat (coagulation rate) was set at 30%.

Figure 17:
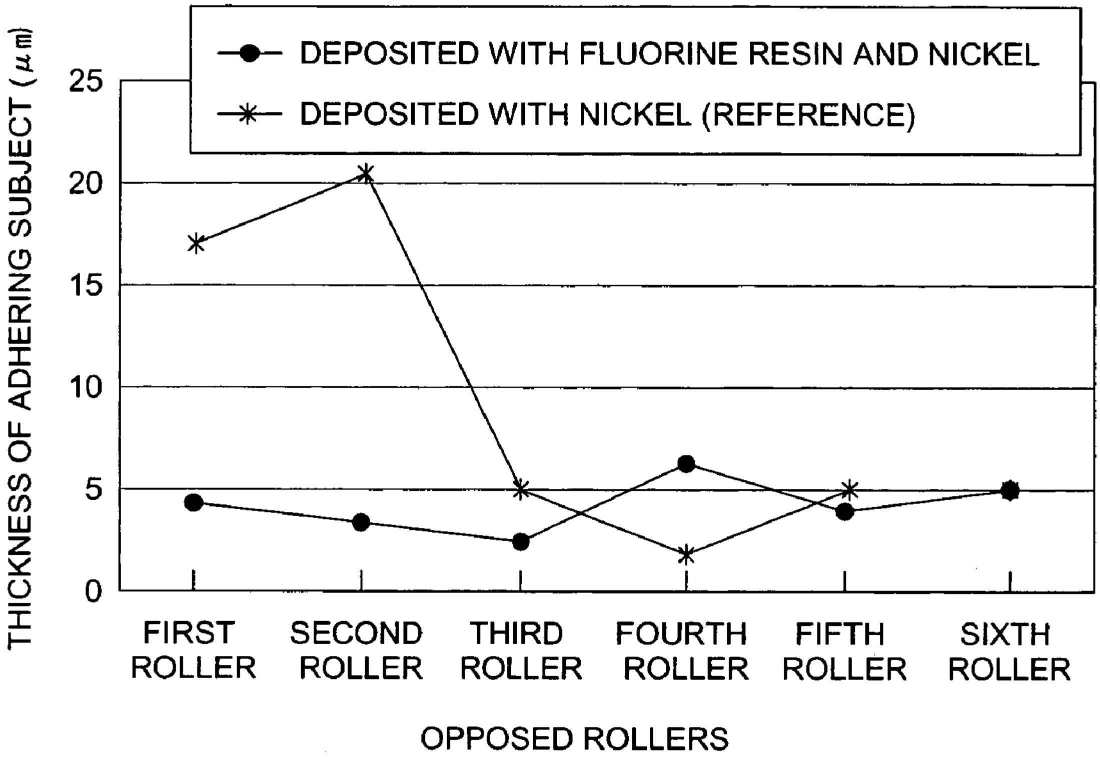
FIG. 17 is a graph showing measured data of the thickness of dart-adhesive matter formed on each opposed roller after processing 15,000 films. The measuring condition is as following. 17×14 inch size film is processed in the photo-thermographic recording apparatus of the present invention at the rate of 100 films/hour, 1,000 films/day. The power is turned of at the end of the day. The power is turned on in the following day.

After processing fifteen thousand photo-thermographic film of 14×17 inch films, the thickness of dirt adhesive adhered on each opposed roller in the photo-thermographic recording apparatus of the embodiment above was measured. The measurement result will be shown in FIG. 17. FIG. 17 is a graph showing the test data of the thickness of the dirt adhesive on each opposed rollers under the following condition. The apparatus used for the test process films processes films at the rate of 100 films/hour, 1000 films/day and power is turned off end of the day, and turned on in the following day. The thickness of dirt adhesive is measured as the test continues. In FIG. 17, reference data in the same configuration other than a roller on which only nickel is deposited (this is different from one on which nickel and fluorine resin are deposited) is shown.

According to FIG. 17, on a reference, two opposed rollers positioned in the most upstream side contain fairly thick dirt adhesion thereon. On the other hand, on the embodiment of the present invention, dirt adhesive has decreased and the effect of deposit of nickel and fluorine resin is recognized. Dirt adhesive is not formed on opposed rollers positioned on third position from the most upstream position and thereafter on both the embodiment and the reference.

The embodiments of the present invention has been described however, the present invention is not limited to the embodiments. It is possible to modify and vary the present invention without departing from the scope of the present invention. For example, as shown in FIGS. 7–8, the boarder 16*i* between large diameter portion 16*g* and small diameter portion 16*h* is structured in step structure. However, as shown in FIG. 8, a slant portion 16*j* in which the roller diameter gradually decreased from large diameter portion 16*h* to small diameter portion 10*h* may be provided.

Figure 9:
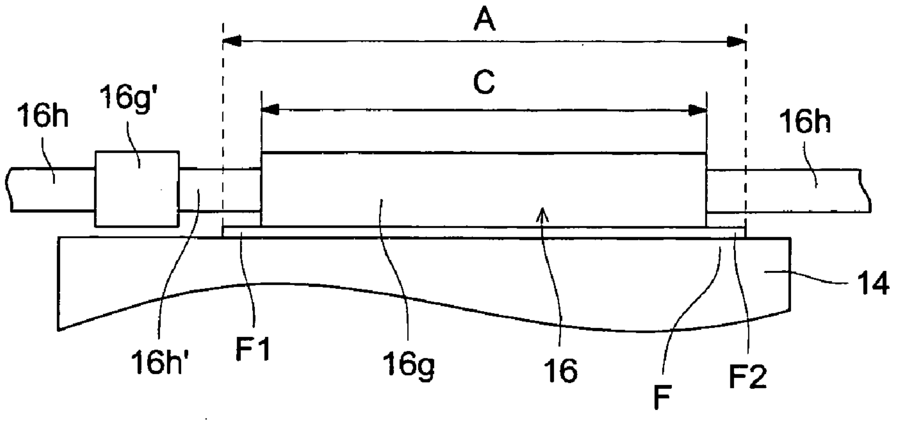
FIG. 9 shows the variation of the opposed roller shown in FIGS. 7 and 8.

As shown in FIG. 9, a small diameter portion 16*h*' may be provided between large diameter portion 16*g* and relatively short large-diameter-portion 16*g*' so that one of the side edge F1 of film F located on heating drum 14 is positioned in small diameter portion 16*h*'. Another edge F2 of film F corresponds to small diameter portion 16*h* as shown in FIGS. 7–8. The configuration shown in FIG. 9 can realize the same effect of the configuration shown in FIGS. 7–8. Sill, opposed with regard to roller 16 shown in FIG. 9, large diameter portions 16*g* and 16*g*' can be continuously manufactured when small diameter portion 16*h*' is formed.

Further, it is preferable that when depositing fluorine resin and nickel, it should be apply not only onto large diameter portion 16*g* and 16*g*' shown in FIGS. 8–9, but also small diameter portion 16*h* shown in FIG. 8, slat portion 16*j* and small diameter portion 16*h* shown in a dashed line in FIG. 8 and small diameter portions 16*h* and 16*h*' in FIG. 9. Since deposition of nickel with fluorine resin can be easily conducted by dipping a target into solution, the depositing is easily applied to a slant portion and a small diameter portion.

In this embodiment, fluorine resin and nickel are deposited onto two opposed rollers 16*a* and 16*b* positioned in most upstream side. However, it is preferable that when foreign matter adhesive described above become problems on other opposed rollers due to the relationship between the structure of thermal developing device 130 and a position of an exhauster, rollers deposited with fluorine resin and nickel are used.

Further, in FIG. 5, the number of rollers having large heat capacity positioned in upstream side can be appropriately varied and when the cylindrical roller is employed, the thickness of the cylindrical roller may be appropriately adjusted. The material may be stainless steal or aluminum material other than steel metal. The diameter of the opposed roller may be three steps or more and a roller having a different diameter may be employed.

Figure 11:
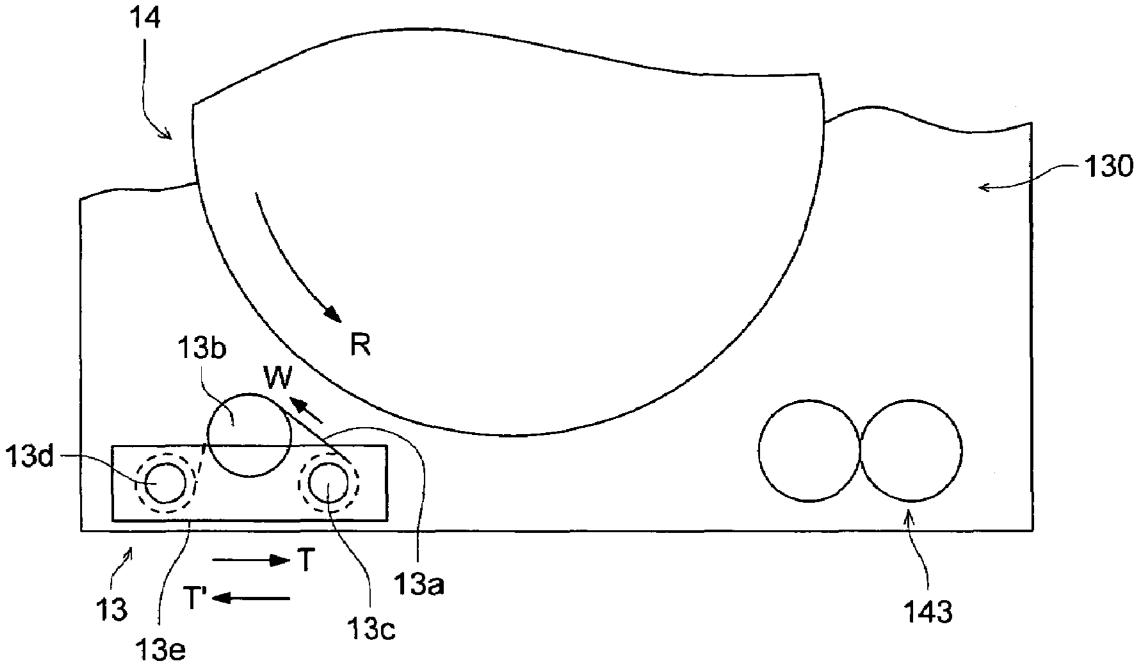
FIG. 11 is a front elevation magnifyably and partially showing a cleaning device and a heating drum.
Figure 12:
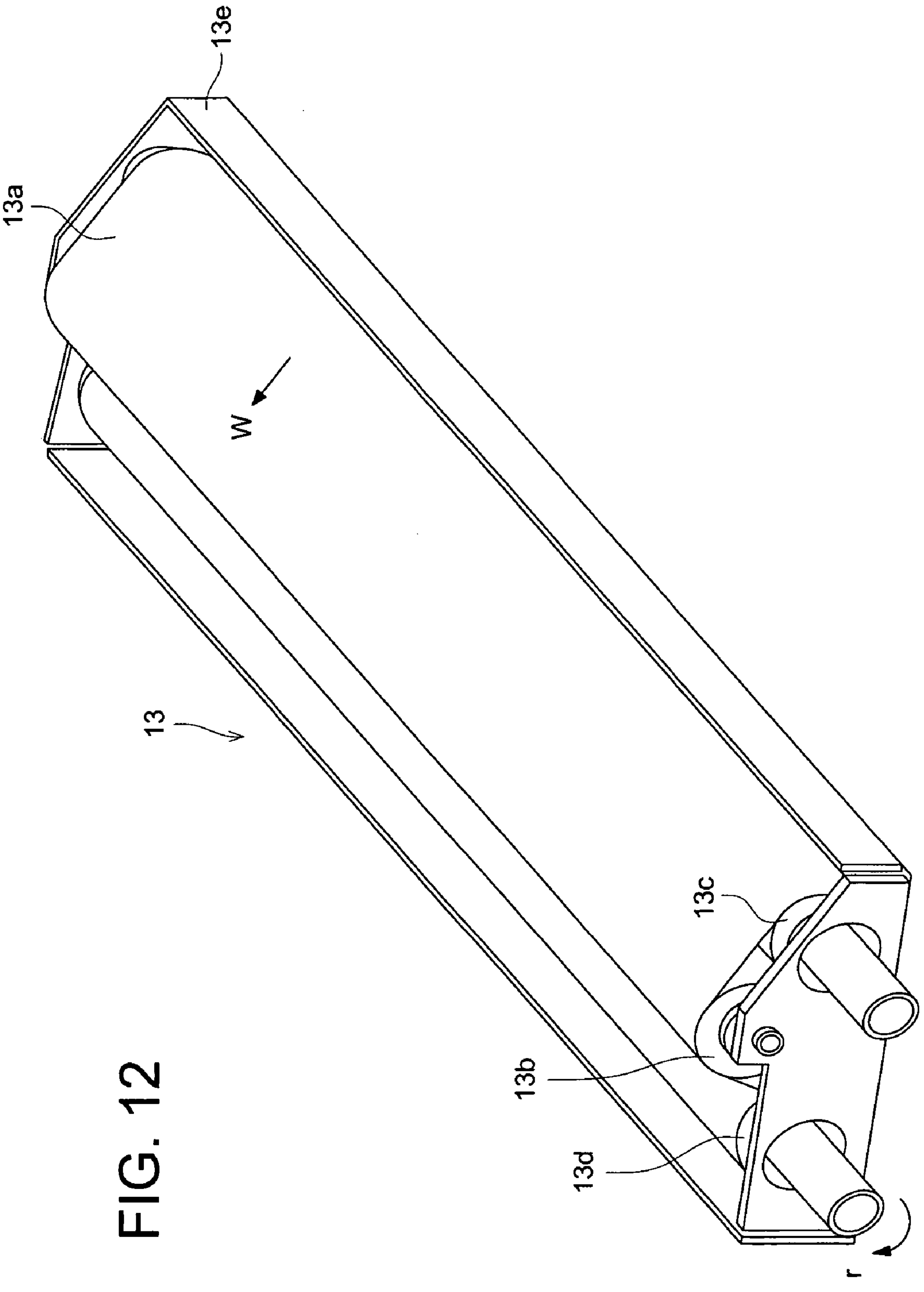
FIG. 12 shows a cleaning device provided in the photo-thermographic recording apparatus shown in FIG. 1.

Cleaning device 13 provided in photo-thermographic recording apparatus shown in FIG. 1 will be described by using FIGS. 11–12. FIG. 11 is a front elevation magnifyably and partially showing a cleaning device and a heating drum. FIG. 12 shows a cleaning device provided in the photo-thermographic recording apparatus shown in FIG. 1.

Cleaning device 13 for cleaning the surface of heating drum 14 is provided under heating drum 14 in thermal developing device 130 of photo-thermographic recording apparatus 100. As shown in FIGS. 11–12, cleaning device 13 comprises cleaning web 13*a* having the same width as that of heating drum 14 in the longitudinal direction, pressing roller 13*b* for pressing cleaning web 13*a*, roll-out roller 13*c* for supplying cleaning web 13*a* being wound, roll-up roller 13*d* being driven for rolling in cleaning web 13*a* from pressing roller 13*b* and chassis 13*e* for housing rollers 13*b*–13*d*.

Cleaning device 13 is moved in the direction indicted by arrow T from a solid line position shown in FIG. 11 by moving device 153 shown in FIG. 13. Cleaning web 13*a* contacts the surface of heating drum 14 (the surface to which a film contact) and is pressed for tightly contacting the surface of heating drum 14 by pressing roller 13*b* for cleaning the surface of heating drum 13. After completing the cleaning, cleaning web 13*a* moves in the direction indicated by arrow T' and moves away from the surface of heating drum 13. Still, moving device 153 is structured so that moving device 153 moves chassis 13*e* by a reciprocal mechanism having a motor, wire and a pulley in the directions T and T', which is well known. However, it is not limited to the embodiment described above.

As described above, since cleaning device 13 firmly presses cleaning web 13*a* against the surface of heating drum 14 in cleaning and keeps away from it in non-cleaning, cleaning web does not increase load for heating drum 14 when it rotates for heating film.

Cleaning web 13*a* is structured by a long sheet of non-woven fabric absorber. Cleaning web 13*a* has thermal resistance for heat from heating drum 14 and chemical resistance for enduring organic acid and cohesion substance such as MEK and efficiently absorbs adhesion on the surface of heating drum 14 by contacting pressing roller.

When roll-up roller 13*d* is rotated in the rotation direction r as shown in FIG. 12 by cleaning motor 154 shown in FIG. 13, an unused portion of cleaning web 13*a* being stored in roll-out roller 13*c* is pulled out and contacted the surface of smooth surface layer 39 of heating drum 14 by pressing roller 13*b*. After finishing cleaning, cleaning web 13*a* is rolled up by roll-up roller 13*d*.

When cleaning heating drum 14, heating drum 14 rotates in the direction R so that the whole outer peripheral surface of heating drum 14 is cleaned. At that time, cleaning web 13*a* moves in the direction W as shown in FIG. 11. Namely, cleaning web 13*a* from roll-out roller 13*c* is rolled in by roll-in roller 13*d* while it is moved in the direction W and pressed onto the surface of smooth surface layer 39 of heating drum 14 for cleaning as shown in FIG. 11.

It may be also possible to contact stopped cleaning web 13*a* to smooth surface layer 39 of heating drum 14 while heating drum 14 rotates in the direction R. In this case, it is preferable that after finishing the cleaning and cleaning device 13 moves away from heating roller 14 in the direction T' indicated by an arrow in FIG. 11, roll-in roller 13*d* rolls up cleaning web 13*a* from roll-out roller 13*c* in order to position an unused portion of cleaning web 13*a* on the pressing roller 13*b* for being prepared for the next cleaning.

A control system for controlling cleaning device 13, paired conveyance rollers 144, conveyer 5 will be described by using FIG. 13. FIG. 13 is a block diagram of the control system for controlling cleaning device 13, conveyance roller 144 and conveyer 5 shown in FIGS. 1, 11 and 12 respectively.

Controller 152 shown in FIGS. 4 and 13 controls micro stepping motor 155 for healing roller 14, moving device 153 for moving cleaning device 13 and cleaning motor 154 based on the full size information included in the attached information attached with received image information from outside image signal outputting apparatus 121 shown in FIG. 3. Namely, every time when controller 152 receives image information including image signal S, controller 152 checks the full size information. If controller 152 detects that a film size is changed from a small size film to a large size film, controller 152 stops conveying the film, rotates heating drum 14 by using micro stepping motor 155, move cleaning device 13 in the direction T as shown in FIG. 11 by using moving device 153 and conducts cleaning by pressing cleaning web 13*a* to heating drum 14 for cleaning the surface of heating roller 14 while heating drum 14 is rotated.

Also controller 152 controls motors 155 and 156 for driving paired conveyance rollers 143 and 144, and driving motor for conveyer 5 in order to select the different sizes of films from loading devices 11 and 12.

A guide for guiding film F moved away from heating drum 14 for the first time by using FIGS. 2 and 5. As shown in FIGS. 2 and 5, Guide member 210 for separating and conveying developed film from heating drum 14 is provide under the most downstream opposed roller 16*e* stream and between heating drum 14 and conveyance roller 148. Namely, guide member 210 is placed so that guiding surface guides film F conveyed between heating drum 14 and opposed roller 16 and left smooth surface layer 39 arranged in the most outer peripheral surface of heating roller 14 in the first time.

As shown in FIG. 2, positioning device 250 for positioning guide member 210 with regard to heating drum 14 is provided on both edges of guide member 210. The distance between leading edge 210*a* of guide member 210 and heating drum 14 is kept constant by contacting rotary member 251 forming a thrusting roller of positioning member 250 to heating roller 14 in both sides.

Figure 14:
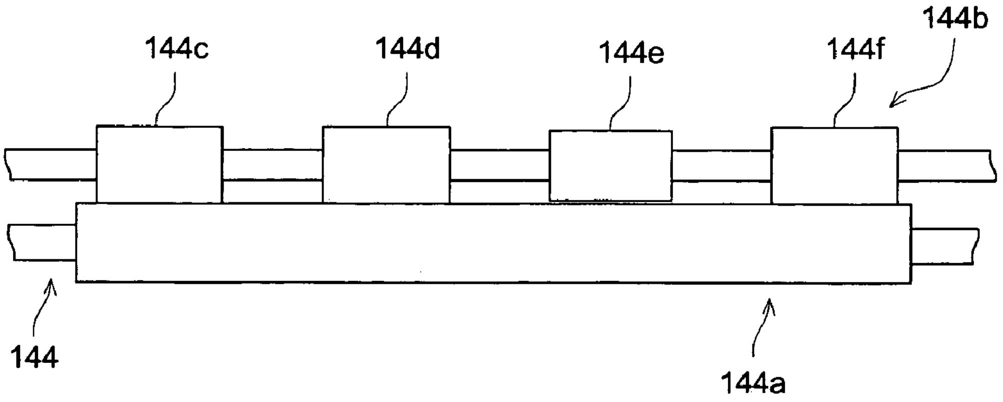
FIG. 14 is a schematic diagram of paired conveyance rollers 144 shown in FIG. 1 for slant position conveyance of a film.

Next, an example for conveying a small size film being in a slant position with regard to a heating drum and opposed rollers in thermal developing device 130 will be described by using FIG. 14. FIG. 14 is a schematic diagram of paired conveyance rollers 144 shown in FIG. 1 for slant position conveyance of a film.

As shown in FIG. 14, paired conveyance rollers 144 are provided just before upstream of paired conveyance rollers 143 provided adjacent to entrance of thermal developing device 130 and paired rollers 144 comprise driving roller 144*a* structured by metal roller driven by motor 156 control by controller 152 shown if FIG. 13, and following rollers 144*b*. Following rollers 144*b* includes a plurality of rubber rollers 144*c*, 144*d*, 144*e* and 144*f* each of which is separately provided in the outside of a rotary shaft.

The plurality of rubber rollers 144*c*–144*f* conveys a large size film, for example, a film having width of fourteen inches, and inside rubber rollers 144*d* and 144*e* involve conveyance of small size film, for example, a film having width of eight inches.

Further, following rollers 144*b* is constructed so that following rollers 144*b* can be pressed or moved to/from driving roller 144*a* by a driving device such as a solenoid. When following rollers 144*b* presses driving roller 144*a*, each following rollers 144*c*–144*f* becomes ready for conveying film with predetermined nip pressure. When following rollers 144*b* moves away from driving roller 144*a*, film conveyance stops.

The diameter of either rubber rollers 144*d* or 144*e* being internal rollers of following rollers 144*b*, for example, following roller 144*e* is arranged smaller than that of other rubber rollers 144*c*, 144*d* and 144*f*. Since, when a film is conveyed into between driving roller 144*a* and following rollers 144*b* perpendicularly with regard to the surface of the drawing paper sheet, a film pressing timing of rubber roller 144*e* is slightly delayed, the film slightly slants the position in a film plane with regard to the film conveyance direction. It is possible to change the degree of slat of the film by adjusting the diameter of rubber roller 144*e*.

Figure 15:
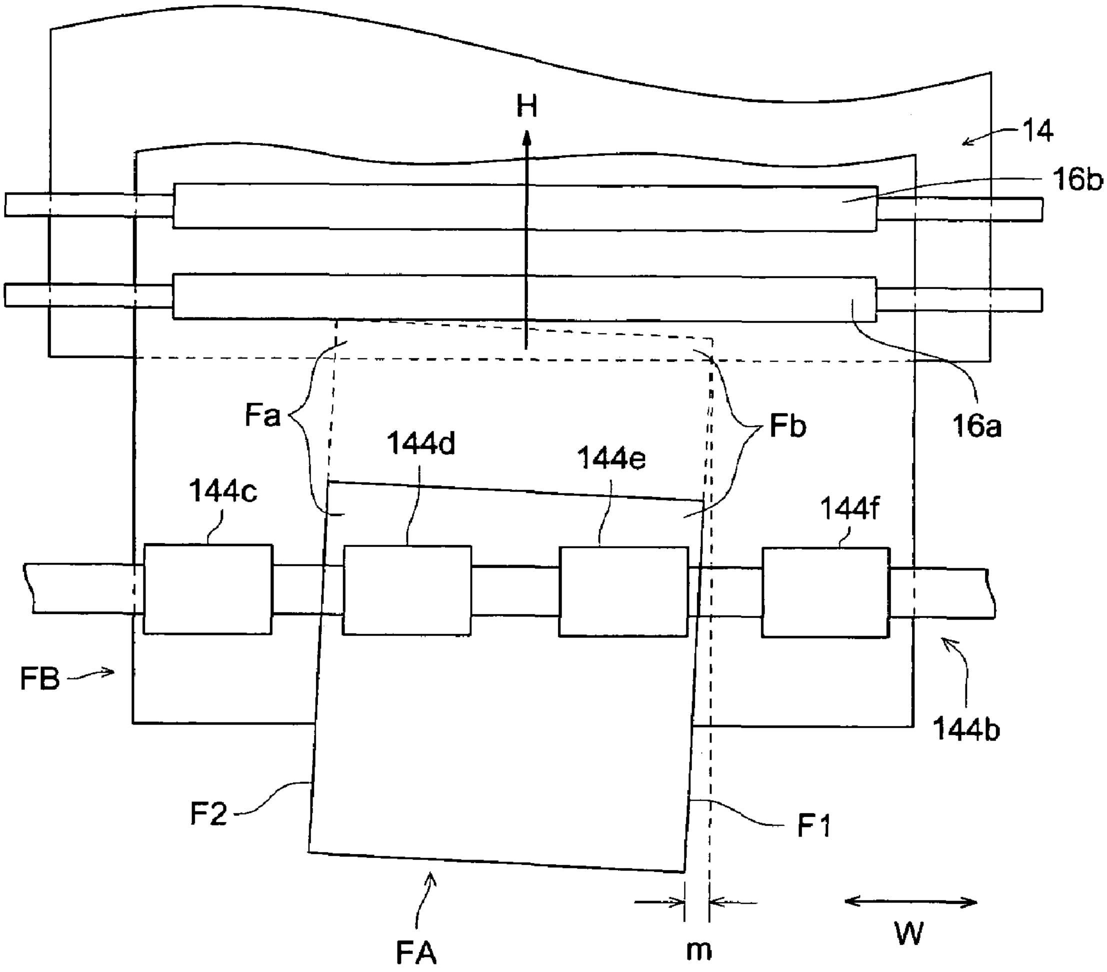
FIG. 15 is a front elevation schematically showing a small size film being conveyed in a slant condition with regard to the outer peripheral surface of the heating drum shown in FIG. 1 and a large size film being conveyed substantially parallel to the conveyance direction.

Next, the slant conveyance of the small size film with regard to a heating roller and opposed rollers, and the cleaning effect performed when a film is changed to a large size film will be described by referring to FIG. 15. FIG. 15 is a front elevation schematically showing a small size film being conveyed in an slant position with regard to the outer peripheral surface of the heating drum shown in FIG. 1 and a large size film being conveyed substantially parallel to the conveyance direction. In FIG. 15, following rollers 144*c*–144*f* shown in FIG. 14, of paired conveyance rollers 143 are shown in order to make description simple.

The film sandwiched in a nip section formed by driving roller 144*a* and rubber rollers 144*c*–144*f* of following roller 144*b* is conveyed by driving roller 144*a*.

As shown in FIG. 15, small sized film FA is conveyed referring the center of heating drum 14. On the other hand, large sized film FB is also conveyed referring the center of heating roller 14 and is substantially right angle to opposed roller 16. Still, "plural sizes of film are conveyed in a plurality of phases in the width direction" means, that for example, each sized film is conveyed in different positions (different phases) in width direction W as shown in FIG. 15.

In case that small sized film FA (for example, 8×10 inch sized film) is conveyed, since the diameter of rubber roller 144*e* is smaller than that of other rubber rollers, pressing timing of rubber roller 144*e* delays comparing with that of other rubber roller, for example, 144*d*. Consequently, the film conveyance of right front corner Fb of small sized film FA delays and as a result, left corner Fa is conveyed earlier which resulting a slant conveyance.

Then, small sized film FA enters between heating drum 14 and opposed roller 16*a* as shown in dashed line and right corner Fb enters following the entrance of let corner Fa with a small differences corresponding to the slant of the film. Film F is conveyed between following opposed roller 16*b* and heating drum 14 as the same position of film slant is kept, and sequentially conveyed by opposed rollers in the downstream side.

As described above, since small sized film FA gradually enters into each opposed roller 16 with the corner of the film first, the entrance resistance is decreased comparing with that of parallel conveyance. As a result, it becomes possible to depress the optical density unevenness due to the arrangement pitch of opposed roller 16.

As described above, since small sized film FA is conveyed into each opposed rollers 16*a*, 16*b*, etc., with a slant position, the entrance position of the film with regard to each opposed roller 16 is different in terms of front and rear edges. Consequently, film F is conveyed as the side edges F1 and F2 of film F is shifted relative to the each opposed roller 16. As a result, since film cutting dross and emulsion flakes are not concentrated into a line shape, but they are distributed. Namely, since cores on which cohesive substance (higher fatty acid volatized from the film in operation being solidified in non-operation as temperature coming down) are distributed, it becomes difficult for cohesive substance to grow into large size foreign matters. As a result, it becomes difficult for cohesive substance to be adhered. For this reason, since it becomes possible to secure uniform contact and heat transmission between heating drum 14 and film F and opposed rollers 16 when a film is heated and conveyed in thermal developing device 130, image deteriorations due to optical density unevenness can be prevented.

Further, when film size is changed from small sized film FA to large sized film FB, for example, to 17×14 inch sized film, as shown in FIG. 15, image signal S associated image data including the film size information is inputted to the apparatus from outside image signal output apparatus 121. Controller 152 determines whether the film size is changed from a small sized film to a large sized film based on the film size information. When controller determines that the film has been changed from a small sized film to a large sized film, it stops the conveyance of the film and cleaning device 13 film start cleaning the surface of heating drum 14.

As described above, since passing footmarks on the surface of heating drum 14 are removed by cleaning web 13*a* by the cleaning before the processing a large sized film, it does not affect to the image of large sized film.

Further, according to the slant conveyance of small sized film, comparing with conventional cases, it becomes difficult for clumping subject to grow to large solid foreign matter and cleaning effects are improved. Since, cleaning is performed when a film is changed to a large sized film, the maintenance cycle of an apparatus can be prolonged and maintenance cost can be lowered.

The cleaning by cleaning device 13 may be conducted based on the number of times of small sized film process before changing to a large sized film. In this case, since the adhesion distribution of the emulsion flakes and cutting dross onto the surface of heating drum 14 is distributed due to the slant conveyance described above, a large number of processing for small sized films can be set and the number of times of cleaning can be lowered.

Further, in case that the maximum small sized film which can be process (with regard to width) is, for example, 8×10 inch sized film, the phase difference between the leading edge and rear edge of the film is 2–6 mm per 10 inches, the optical density unevenness due to rush entrance to opposed roller 16 is not recognized. The foreign matter originated from a film such as the emulsion flakes is distributed, and foreign matters on heating drum 14 and each opposed roller 16 are not concentrated into one point or one line.

In case that the most outside surface of elastic layer 38 of heating drum 14 is formed by fluorine resin, emulsion flakes of a film and cutting dross are easily adheres onto metal opposed roller 16 due to the good mold release characteristic, but not on heating drum 14. Since foreign matters and solid subjects which give damages to smooth surface layer is difficult to be occurred, long life smooth surface layer 38 can be realized.

If a film is conveyed in a slant position before a film exposing process, image data has to be arranged to correspond the slant position for the film exposure. In order to do this, the control sequence and the configuration of controller 152 become complicated. However, according to the embodiment of the present invention, since the slant conveyance begins after the exposure, the configuration of controller 152 does not become complicated.

The present invention is explained based on the embodiment described above. However the present invention is not limited to the embodiment. It may be changed and modified without departing from the scope of the present invention. Foe example, in FIG. 5, the number of opposed rollers having large thermal capacity located in the upstream side may be increased or decreased. The opposed rollers may be structured by a large diameter steal pipe shaped roller whose the thickness of pipe may be properly adjusted. The Material of the roller may be steel or aluminum other than stainless steal. The diameter of the opposed roller may be changed in three steps or more or rollers having different diameter may be arranged in turn.

Further, in this embodiment, conveyance roller 144 provided in the upstream of paired conveyance rollers 143 arranged adjacent thermal developing device 130 is used for the slant conveyance of a film. However, it is not limited to this embodiment. One of the paired rollers from paired conveyance rollers 144 to paired conveyance rollers 146 may be used for the slant conveyance. As described above, once a latent image is formed by two pairs of conveyance rollers 142, it is possible to control the position of the small sized film by adjusting a left and right pressing timing and/or nipping pressure of small sized film as shown in FIG. 14 while the film is conveyed upward.

In case that paired conveyance rollers 146 positioned in just downstream side of paired conveyance roller 142 is used the slant conveyance, it is necessary to open opposed roller 146 by using a driving device such as a solenoid so that the exposed portion of the rear edge the film is not affected by the conveyance of the leading edge of the film, and to close rollers 146 after finishing the exposure of the rear edge of the film. Paired conveyance rollers 146 may be, for example, just like a structure shown in FIG. 14. Accordingly, a small sized film is inclined while the film is conveyed only by paired conveyance roller 146, conveyed in a slant position and conveyed into heating drum 14 via paired heating rollers 145, 144 and 143 having the same nipping pressure in left and right portions.

Figure 16:
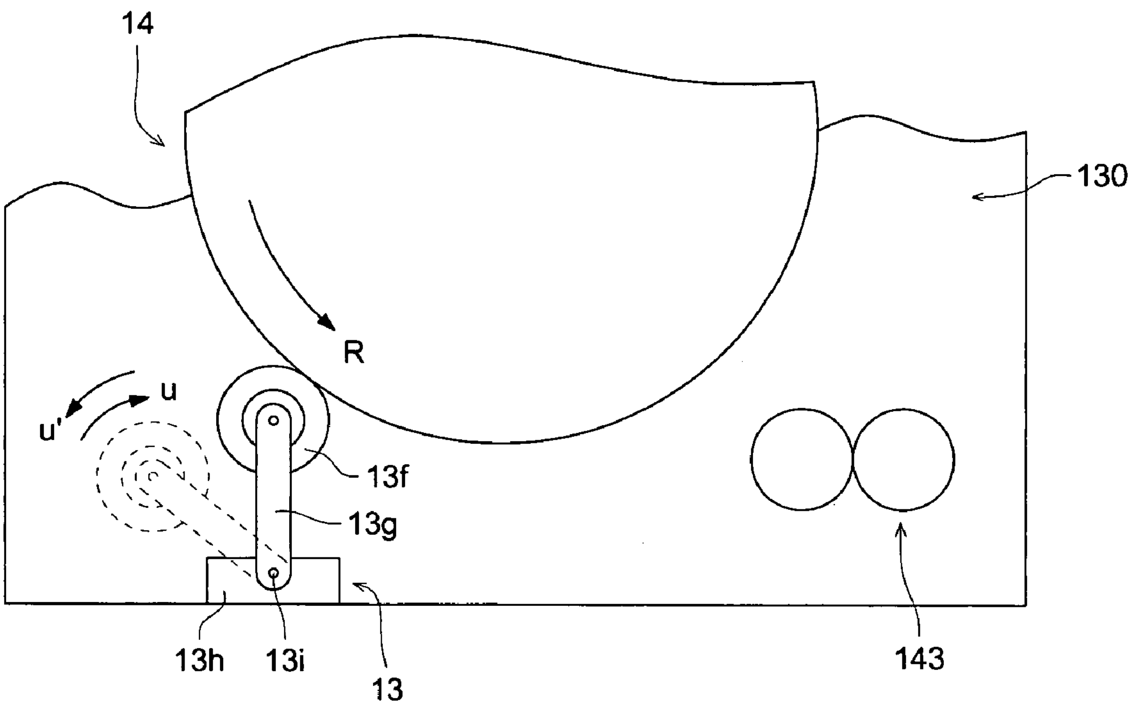
FIG. 16 is a front elevation showing the variation of a cleaning device being the same as shown in FIGS. 11 and 12.

Further, cleaning device as shown in FIG. 16, may comprises a single cleaning roller. Namely, in cleaning device 13 shown in FIG. 16, cleaning roller **13*f* linked to arm 13*g* is arrange so as to swing with arm 13*g* in the directions u or u' centering swing shaft 13*i*. Cleaning roller 13*f* swings in the direction u by the forced power device such as a coil (not shown). When cleaning roller 13*f* presses the surface of heating drum 14, it starts cleaning the surface of heating drum 14 while being rotated by rotated heating drum 14. When non-cleaning, cleaning roller 13*f* is swung in the direction u' by releasing the forced power by a releasing device (not shown) and moves away from the surface of heating drum 14**.

What is claimed is:

1. A photo-thermographic recording apparatus, comprising:

a film loading device capable of loading a sheet type photo-thermographic film;

a conveyance device for conveying the photo-thermographic film from the film loading device;

an exposing device for forming a latent image corresponding to an image signal onto the sheet type photo-thermographic film conveyed by the conveyance device; and a thermal developing device for visualizing the latent image formed onto the sheet type photo-thermographic film while heating the sheet type photo-thermographic, the thermal developing device including a heating device therein and a plurality of opposed rollers arranged opposite to the heating device so as to press the sheet type photo-thermographic film onto the thermal developing device;

wherein the plurality of opposed rollers is structured so that a foreign matter originating from an edge portion of the sheet type photo-thermographic film does not affect an image formed on the sheet type photo-thermographic film.

2. The photo-thermographic recording apparatus of claim 1, wherein the plurality of opposed rollers is structured not to contact the sheet type photo-thermographic film in an area adjacent to both edges of the sheet type photo-thermographic film being in contact with the heating device.

3. The photo-thermographic recording apparatus of claim 1, wherein the plurality of opposed rollers has a large diameter portion with each opposed roller, the large diameter portion being capable of contacting the sheet type photo-thermographic film within the opposed roller contacting area.

4. The photo-thermographic recording apparatus of claim 1, wherein the plurality of opposed rollers has a small diameter portion with each opposed roller, the small diameter portion corresponding to an edge portion of the sheet type photo-thermographic film.

5. The photo-thermographic recording apparatus of claim 2, wherein the heating device includes a smooth surface layer on a most outer peripheral-layer of the heating device.

6. The photo-thermographic recording apparatus of claim 2, wherein the plurality of opposed rollers is structured not to contact portions adjacent to both sides of the photo-thermographic film and the exposing device corrects an exposing amount of an area where the sheet type photo-thermographic film is not in contact with the plurality of opposed rollers.

7. The photo-thermographic recording apparatus of claim 6, further comprising:

a memory device for storing a correction amount of exposure of the area where the sheet type photo-thermographic film is not in contact with the plurality of opposed rollers and the exposing amount is corrected based on the correction amount stored in the memory device when the latent image is formed by the exposing device.

8. The photo-thermographic recording apparatus of claim 6, wherein the heating device includes a smooth surface layer on a most outer peripheral-layer of the heating device.

9. The photo-thermographic recording apparatus of claim 1, wherein the plurality of opposed rollers including a predetermined opposed roller on which fluorine resin is deposited.

10. The photo-thermographic recording apparatus of claim 9, wherein the predetermined opposed roller is structured by a metallic material on which nickel and fluorine resin are deposited.

11. The photo-thermographic recording apparatus of claim 9, wherein the predetermined opposed roller is provided in an inlet position where the photo-thermographic film on which a latent image is formed approaches with regard to the heating device.

12. The photo-thermographic recording apparatus of claim 9, wherein the predetermined portion where the plurality of opposed rollers contacts the sheet type photo-thermographic film is narrower than a film contacting portion where the sheet type photo-thermographic film contacts the heat developing device.

13. A photo-thermographic recording apparatus, comprising:

a film loading device capable of loading a plurality of sizes of sheet type photo-thermographic film;

a conveyance device for conveying a sheet type photo-thermographic film from the film loading device;

an exposing device for forming a latent image corresponding to an image signal onto the sheet type photo-thermographic film conveyed by the conveyance device; and a thermal developing device for visualizing the latent image formed onto the sheet type photo-thermographic film while the thermal developing device heats the photo-thermographic film, thermal developing device including a heating device and a plurality of opposed rollers for pressing the sheet type photo-thermographic film onto the thermal developing device;

wherein the plurality of sizes are conveyed so that each contact area of each of the plurality of sizes with respect to the opposed roller does not coincide and, wherein the plurality of opposed rollers is structured so that a foreign matter originating from an edge portion of the sheet type photo-thermographic film does not affect an image formed on the sheet type photo-thermographic film.

14. The photo-thermographic recording apparatus of claim 13, wherein the plurality of opposed rollers includes a predetermined opposed roller on which fluorine resin is deposited and at least the predetermined opposed roller does not contact an edge portion of a maximum size of the photo-thermographic film.

15. The photo-thermographic recording apparatus of claim 14, wherein the opposed roller is structured by an steel material on which fluorine nickel and fluorine resin are deposited.

16. The photo-thermographic recording apparatus of claim 13, wherein the conveyance device conveys different sizes of sheet type photo-thermographic film with a plurality of different phases in a lateral direction, and conveys a smaller size of sheet type photo-thermographic film on a slant to the opposed roller of the heating device, rather than a maximum size in the lateral direction.

17. The photo-thermographic recording apparatus of claim 16, wherein the conveyance device includes a first conveyance device for conveying the sheet type photo-thermographic film from the loading device to the exposing device and a second conveyance device for conveying the sheet type photo-thermographic film to the heating device on a slant to the opposed roller of the heating device after the exposing device.

18. The photo-thermographic recording apparatus of claim 16, wherein the heating device has an elastic layer on a most outer peripheral-layer of the heating device.

19. The photo-thermographic recording apparatus of claim 18, wherein the heating device has smooth surface layer on a most outer peripheral-layer of the heating device.

20. The photo-thermographic recording apparatus of claim 16, further comprising:

A cleaning device for cleaning a film contact surface of the heating device, wherein the cleaning device is controlled so as to clean the film surface of the heating device when the sheet type photo-thermographic film having a smaller phase size in the lateral direction is replaced with the one having a larger phase size in the lateral direction.

21. The photo-thermographic recording apparatus of claim 20, wherein the heating device has smooth surface layer on a most outer peripheral-layer of the heating device.

* * * * *